United States Patent
Jain

(10) Patent No.: US 10,041,797 B2
(45) Date of Patent: Aug. 7, 2018

(54) FIBER OPTIC GYROSCOPE WITH 3×3 AND 2×2 WAVEGUIDE COUPLERS

(71) Applicant: Faquir Chand Jain, Storrs, CT (US)

(72) Inventor: Faquir Chand Jain, Storrs, CT (US)

(*) Notice: Subject to any disclaimer, the term of this patent is extended or adjusted under 35 U.S.C. 154(b) by 0 days.

(21) Appl. No.: 14/874,010

(22) Filed: Oct. 2, 2015

(65) Prior Publication Data
US 2017/0199037 A1    Jul. 13, 2017

Related U.S. Application Data

(60) Provisional application No. 62/058,984, filed on Oct. 2, 2014.

(51) Int. Cl.
| | |
|---|---|
| G01C 19/72 | (2006.01) |
| G02B 6/122 | (2006.01) |
| G02B 6/12 | (2006.01) |
| G02B 6/293 | (2006.01) |

(52) U.S. Cl.
CPC ....... *G01C 19/721* (2013.01); *G02B 6/12004* (2013.01); *G02B 6/1225* (2013.01); *G02B 6/29347* (2013.01)

(58) Field of Classification Search
CPC .............. G01C 19/721; G02B 6/29347; G02B 6/1225; G02B 6/12004
See application file for complete search history.

(56) References Cited

U.S. PATENT DOCUMENTS

| | | | | |
|---|---|---|---|---|
| 4,440,498 A | * | 4/1984 | Sheem | G01C 19/725 356/466 |
| 4,653,917 A | * | 3/1987 | Moeller | G01C 19/725 356/466 |
| 4,662,751 A | * | 5/1987 | Goss | G01C 19/726 250/231.12 |
| 4,944,590 A | * | 7/1990 | Poisel | G01C 19/725 356/466 |
| 5,037,204 A | * | 8/1991 | Poisel | G01C 19/725 356/466 |
| 5,194,917 A | * | 3/1993 | Regener | G01C 19/722 356/460 |
| 5,555,088 A | * | 9/1996 | Valette | G01C 19/722 356/465 |
| 6,163,632 A | * | 12/2000 | Rickman | G01C 19/722 356/459 |
| 7,333,690 B1 | * | 2/2008 | Peale | G02B 6/12007 385/16 |

* cited by examiner

*Primary Examiner* — Hwa Lee
(74) *Attorney, Agent, or Firm* — Steven M. McHugh

(57) ABSTRACT

This invention describes a gyroscope using a fiber coil which is coupled using integrated on-chip 3×3 and 2×2 couplers in coplanar as well as non-coplanar (NCP) configuration along with photodetectors, light sources, and processing electronics using Si, SOI, and InGaAs-on-Si, and other substrates. In one embodiment, a high sensitivity gyroscope using a combination of 2×2 and 3×3 waveguide couplers is described. The signals from three photodetectors can be used to generate feedback signals to produce high sensitivity. Still in another embodiment, usage of multiple quantum well (MQW) waveguides is illustrated. MQW waveguides can be tuned to achieve phase modulation/correction in couplers.

4 Claims, 39 Drawing Sheets

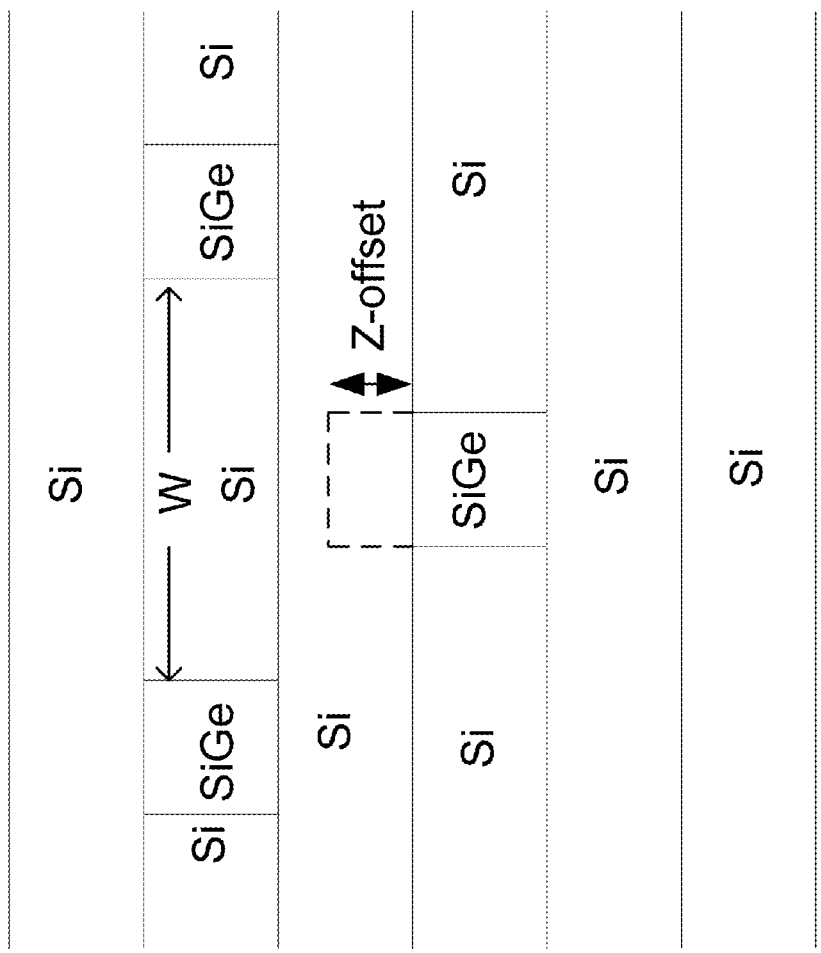

Cross-Section at 2-2

Cross-Section at 3-3

FIBER OPTIC GYROSCOPE WITH 3×3 AND 2×2 WAVEGUIDE COUPLERS

RELATED APPLICATIONS

This application claims benefit of the filing data of U.S. Provisional Patent Application Ser. No. 62/058,984, filed Oct. 2, 2014, the contents of which are incorporated by reference herein in its entirety

FIELD OF THE INVENTION

This invention relates to the development of a gyroscope using a fiber coil and an integrated opto-electronic chip comprising of optical couplers, photodetectors, a light source, and electronic circuits for control and other functions.

BACKGROUND OF INVENTION

Interferometric fiber optic gyroscopes (FOG) rely on Sagnac effect to measure the angular velocity of a moving object. The clockwise (CW) wave and counter clockwise (CCW) wave in a fiber coil will undergo Doppler shift when the coil rotates within a reference plane. This is the Sagnac phase shift which is proportional to the angular velocity. This is achieved using fiber couplers or ring lasers. Fiber optic gyroscopes (FOG) are reported in the literature based on 2×2 fiber couplers as well as 3×3 couplers [references 1-8] to produce two counter propagating CW (clock wise) and CCW (counter clock wise) signals. Generally, two 2×2 couplers along with one or two photodetectors, a fiber coil, and a light source are used to make an angular velocity detection unit. The operating characteristic of 2×2 coupler based gyroscope makes it less sensitive, a ninety degrees phase modulator is incorporated. Information on three axes can be obtained using three independently oriented units. Generally, 3×3 couplers based design are considered less sensitive due although they inherently operate in the most sensitive part of the response characteristic.

SUMMARY OF THE INVENTION

This invention relates to design of fiber coil based gyroscope unit using on-chip waveguide couplers in various configurations integrating photodetectors, signal processing electronic circuits, and light source. In one embodiment, the substrate is selected from Si, SOI, and InGaAs-on-Si. In another embodiment, a high sensitivity gyroscope using a combination of 2×2 and 3×3 waveguide couplers is described. The signals from three photodetectors can be used to generate feedback signals to produce high sensitivity. Still in another embodiment, usage of multiple quantum well (MQW) waveguides is illustrated. MQW waveguides can be tuned to achieve any phase correction due to birefringence introduced by coil or other components.

A gyroscope which measures movement of a platform, including a plurality of 3×3 and 2×2 waveguide couplers, a plurality of photodetectors, a light emitting source, a plurality of integrated circuits for generating control signals and processing signals from photodetectors, wherein the waveguides are disposed on a substrate selected from Si, Si-on-insulator (SOI), GaAs, InP, GaN, Ge, SiC, Si-on-Sapphire (SOS), wherein plurality of waveguides are constructed from SiGe, Si—SiGe multiple quantum wells, doped SiO2, SiOx-cladded-Si quantum dots, GeOx-cladded-Ge quantum dots, and wherein configuration of said waveguides is selected from buried, ridge, rib, and two-dimensional photonic band gap (PBG), wherein said 3×3 waveguide coupler has three waveguides, two outer and a central waveguide, and wherein the three waveguides are in proximity over a certain length to produce light coupling between them, wherein the two outer and central waveguides are disposed in a configuration selected from coplanar and non-coplanar, wherein two outer waveguide ends of said 3×3 waveguide coupler are interfaced with a fiber coil, and wherein the central waveguide is terminated before the fiber coil interface with a first absorber device which absorb any optical energy not coupled to the outer waveguide in the region where the all three are in proximity, wherein the input ends of the outer waveguides of said 3×3 waveguide coupler are interfaced with first and second photodetectors, and wherein the input end of the central waveguide is interfaced with said light emitting source, and wherein a section of central waveguide between the first absorber device and light emitting source is interfaced with a 2×2 waveguide coupler, and wherein the second waveguide forming the 2×2 coupler along with the central waveguide is interfaced with a third photodetector, and wherein the other end of the second waveguide is interfaced with a second absorber device, and wherein said light emitting source emit optical energy that is compatible with said waveguide couplers and fiber coil, and wherein light emitting source is selected from an on-chip and off-chip structural configurations, and wherein said light-emitting source is ON continuously for a duration that avoids interference from returned optical energy after traversing the fiber coil to enable determination of change in the signal due to light traveling in clockwise and counter clockwise directions, wherein said first, second, and third photodetectors are interfaced with plurality of integrated circuits, and wherein electronic circuits generate control signals and process outputs of said first, second and third photodetectors, and wherein the processed signal information provides data relating to one of the three angular velocity components of the platform plane on which the gyroscope unit is located.

A method of on-chip integration and fabrication of all gyroscope components including a light emitting source, photodetectors, and waveguides couplers in 2×2 and 3×3 configuration, absorber devices, phase modulators on a substrate, wherein material lattice constant of waveguides and cladding layers forming the 3×3 couplers and semiconductor substrate differs from the lattice constant of the said light emitting and photodetector devices, and wherein the method of fabrication to incorporate the said light emitting and photodetector devices is selected from techniques including nano-patterning of a thin masking layer including at least one of a $SiO_2$, SiON, or $Si_3N_4$ material grown or deposited on the substrate, wherein the substrate includes exposed Si regions; growing epitaxially thin buffer layers followed by a transition layer which transitions the lattice constant of the substrate on top of the buffer layers; gliding dislocations from the transition layer into $SiO_2$ or other masking layer walls using heat treatment; performing epitaxial growth of at least one base semiconductor, above the transition layers and performing lateral epitaxial overgrowth of the base semiconductor over the thin $SiO_2$ masking layer; depositing quantum dot layers comprising of GeOx-cladded Ge quantum dot layers, amorphous Si barrier layers, serving as active layer to produce light when appropriately biased; and wherein fabricating a gyroscope as a chip structure on the substrate.

BRIEF DESCRIPTION OF THE FIGURES

The forgoing and other features and advantages of the present invention will be fully understood from the following detailed description of illustrative embodiments, taken in conjunction with the accompanying drawings in which like elements are numbered alike:

FIG. 2a-2 shows a 3×3 fiber coupler FOG with power distribution in the central waveguide and two outer waveguides, in accordance with the prior art.

FIG. 2b-1 shows the anticipated power output as a function of degree rotation for a 3×3 coupler compared with two 2×2 coupler arrangements, in accordance with the prior art.

FIG. 2b-2 shows the anticipated power output as a function of rotation rate for a 3×3 coupler compared with two 2×2 coupler configurations, in accordance with the prior art.

FIG. 4(c) shows cross-sectional schematic of a SiGe coplanar 3×3 coupler on Si substrate.

FIG. 12a shows a schematic block diagram illustrating an embodiment of a photonic integrated circuit combining photodetectors, waveguides and couplers, and InGaAs—InGaAsP based light-emitting source, realized on a Si substrate using technique shown in FIG. 11a.

FIG. 14b shows a cross-sectional schematic block diagram of the Si chip integrating 3×3 waveguide coupler, 3 photodetectors and light source on one substrate of FIG. 14a at cross section 1-1.

DETAILED DESCRIPTION

This invention describes fiber optic coil based gyroscope designs which employ integrated two 2×2, 3×3 and combined 2×2 and 3×3 waveguide couplers. Various embodiments of waveguide couplers and their integration with photodetectors and a light source are envisioned. Waveguides in 2×2 and 3×3 coupler configuration, using SiGe core and Si cladding, Ge-doped $SiO_2$ core and P-doped $SiO_2$ cladding, multiple quantum wells (MQWs) core waveguides [such as $SiGe_x$ quantum well $SiGe_y$ barrier cladding (y>x), SiGe (well)-ZnMgSSe (barrier)], are described. The MQW waveguide can be tuned using quantum confined Stark effect [Reference 9a or published work of D. A. B. Miller, 1984, reference 9b] to implement built-in phase modulator if needed in the design for improved sensitivity. This effect can be also utilized to control birefringence caused by FOG coil or by any other components. This will result in advanced low-cost gyroscope yielding higher sensitivities. In terms of substrates, Si, SiGe, Si-on-insulator (SOI), and InGaAs/InGaAsP-on-Si based integration is described. Two 2×2, a 3×3, and a combination of 2×2 and 3×3 integrated waveguide couplers for different functions are described.

Use of Si, Si-on-insulator (SOI), InGaAs-on Si permits the integration of electronic circuits to implement feedback control units for controlling the phase modulator, processing photodetector signals, and other signal processing functions on the same chip along waveguide couplers. In addition, employing gating characteristics of the source are controlled. Methods of fabrication of Ge detectors on Si via nanodot mediated epitaxial growth as well as nanoisland based dislocation minimized method are presented to implement Si or SOI based silicon, InGaAs, SiGe and MQW wageguides.

This invention also discloses 3×3 non-coplanar waveguides with and without offsets in various configurations. Integration of photodetectors in vertical and lateral configuration is presented. In one embodiment, 3 photodetetors are used in association with 3×3 waveguide coupler. The novelty is in the usage of Si substrates, unique combination of 3×3 and 2×2 couplers to integrate reciprocal detection. A solid state light source can be coupled via a fiber or also shown integrated on Si. Quantum dot superlattice (QDSL) based light sources are shown in a novel way coupled on a Si chip, leaving only the fiber coil to be interfaced via etched grooves in the Si substrate. Photonic band gap (PBG) based waveguide structures are also referred to enhance performance.

Figure 1A:
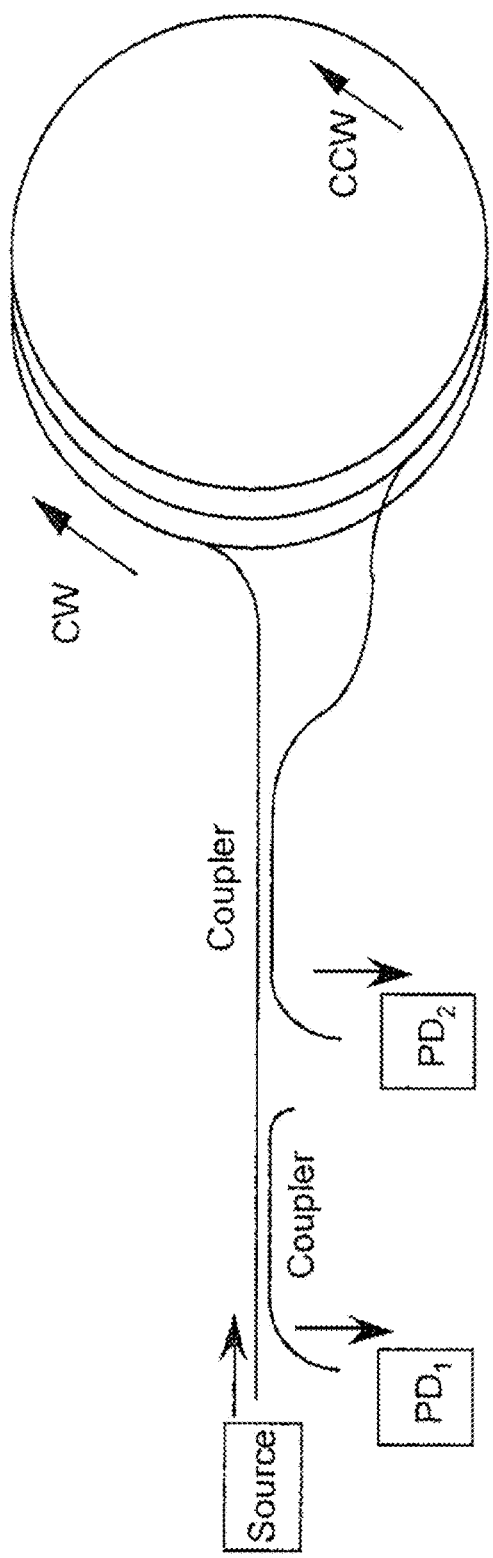
FIG. 1a shows a schematic block diagram of a fiber optic gyroscope using two 2×2 couplers with two photodetectors, in accordance with the prior art.

FIG. 1a Schematic of a fiber optic gyroscope two 2×2 coupler with two photodetectors.

Figure 1B:
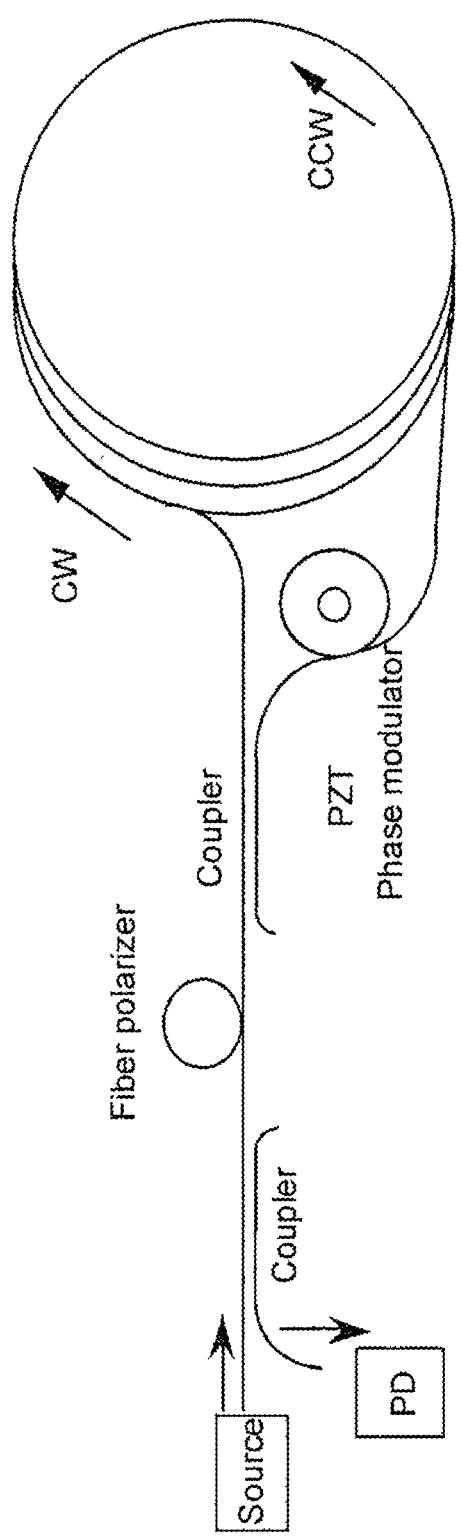
FIG. 1b. shows a fiber optic gyroscope with two 2×2 couplers with a phase modulator, one photodetector, and a fiber polarizer, in accordance with the prior art.

FIG. 1b. Fiber optic gyroscope two 2×2 couplers with a phase modulator, one photodetector, and a fiber polarizer (references 1 and 2).

Figure 1C:
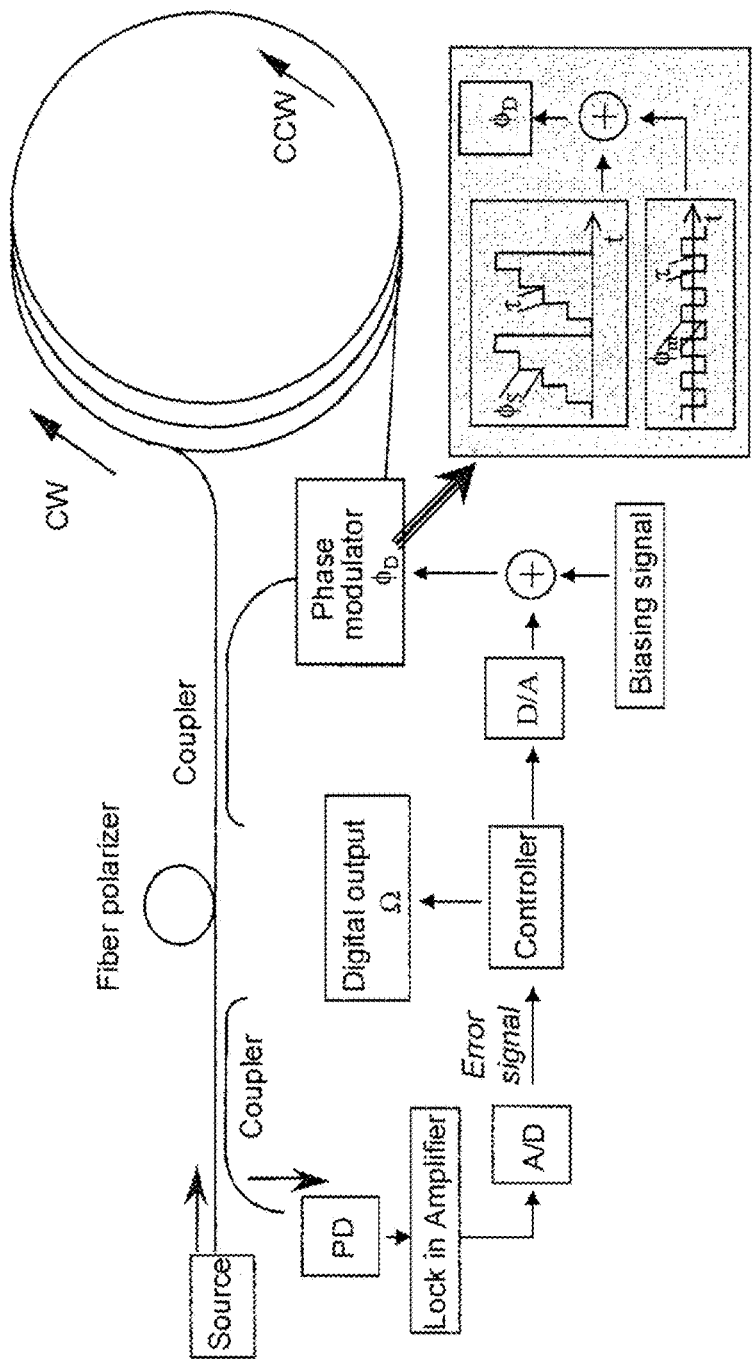
FIG. 1c shows a fiber optic gyroscope schematic with two 2×2 couplers with a phase modulator and polarizer with feedback circuits controlling electrically the phase of the phase modulator to maximize the signal in the photodetector, in accordance with the prior art.

FIG. 1c shows a fiber optic gyroscope schematic with two 2×2 couplers with a phase modulator and polarizer with feedback circuits controlling electrically the phase of the phase modulator to maximize the signal in the photodetector.

Figures 1, 2A:
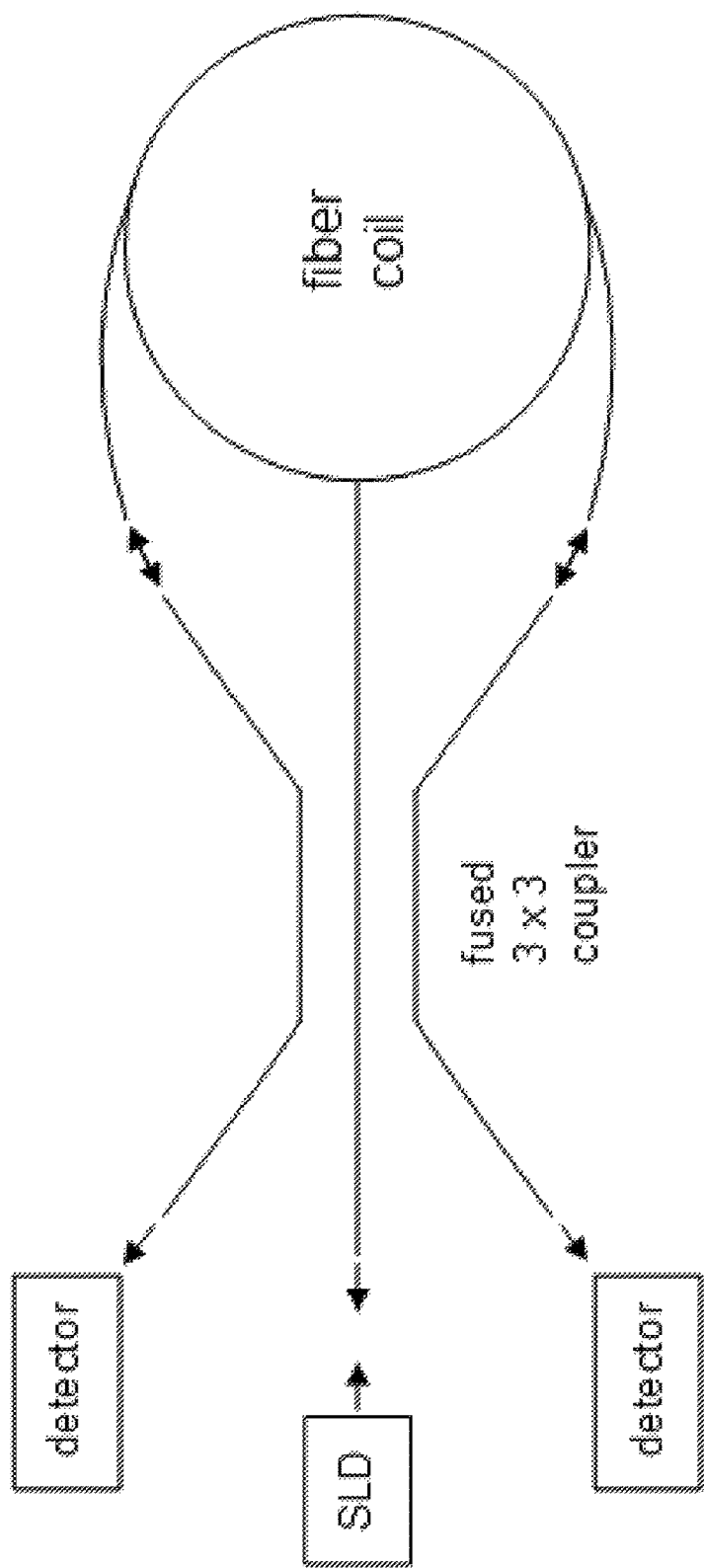
FIG. 2a-1 shows a 3×3 fiber coupler based FOG using a super-luminescent light emitting diode (SLD) and two photodetectors, in accordance with the prior art.

FIG. 2a-1 shows a 3×3 fiber coupler based FOG using a super-luminescent light emitting diode (SLD) and two photodetectors.

Figures 2, 2A:
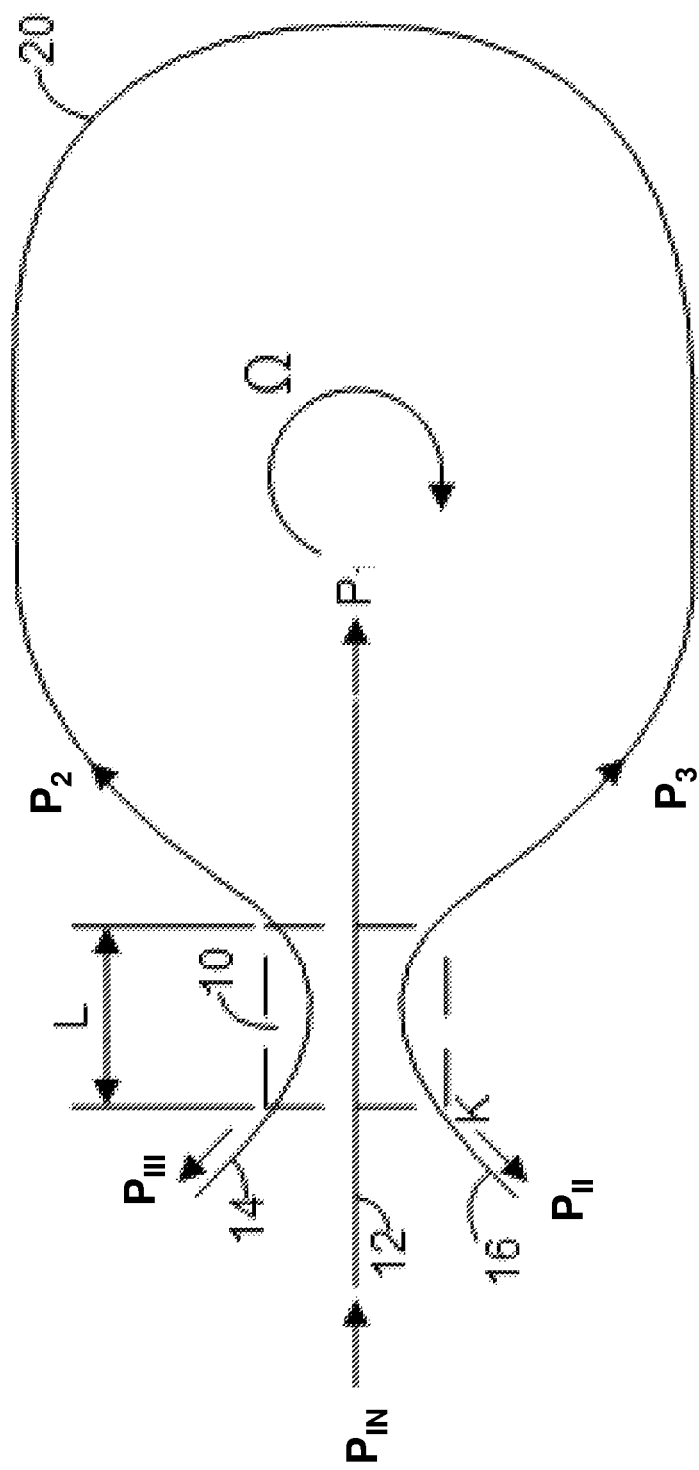

FIG. 2a-2 shows a 3×3 fiber coupler FOG with power distribution in the central waveguide and two outer waveguides.

Figures 1, 2B:
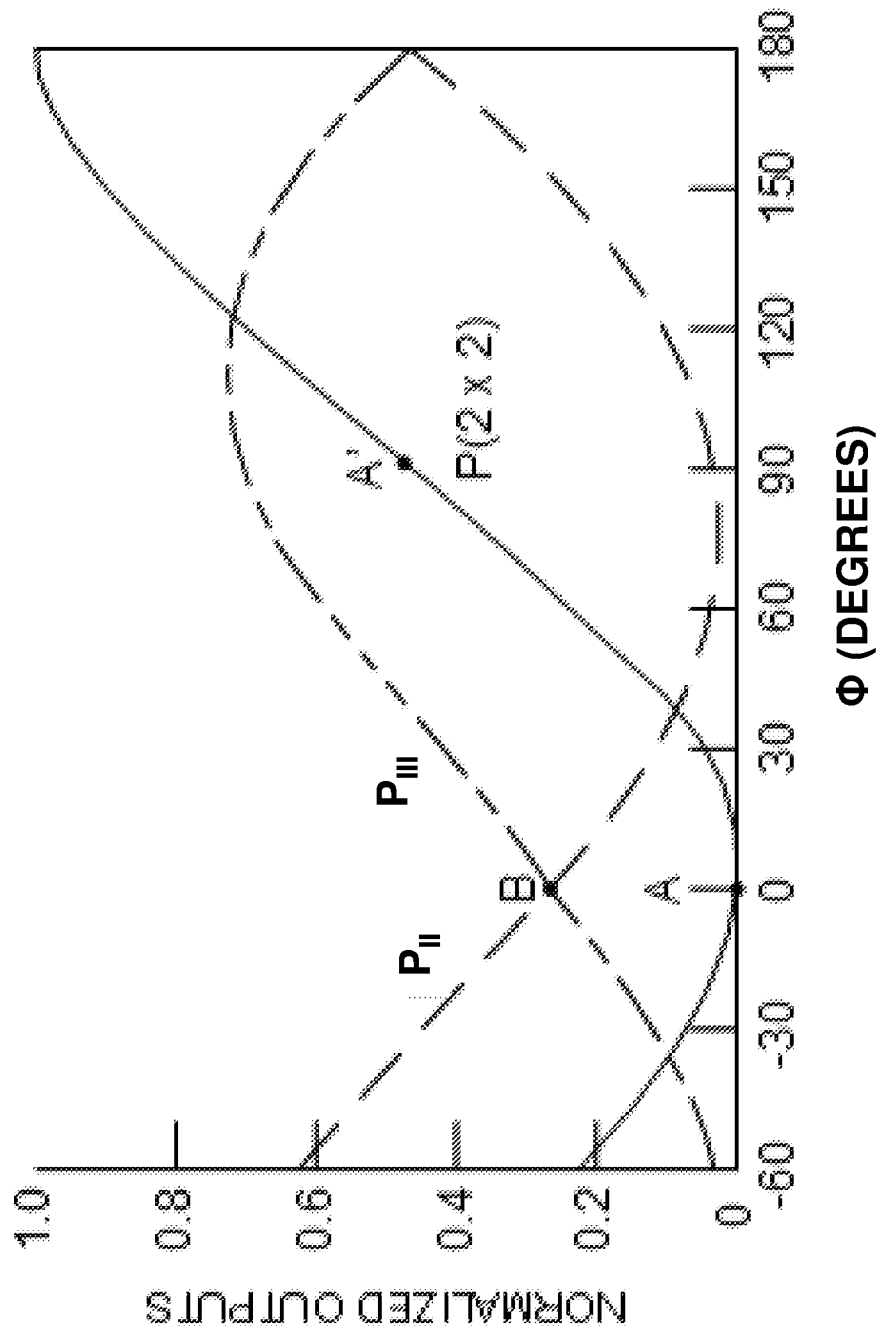
Figures 2, 2B:
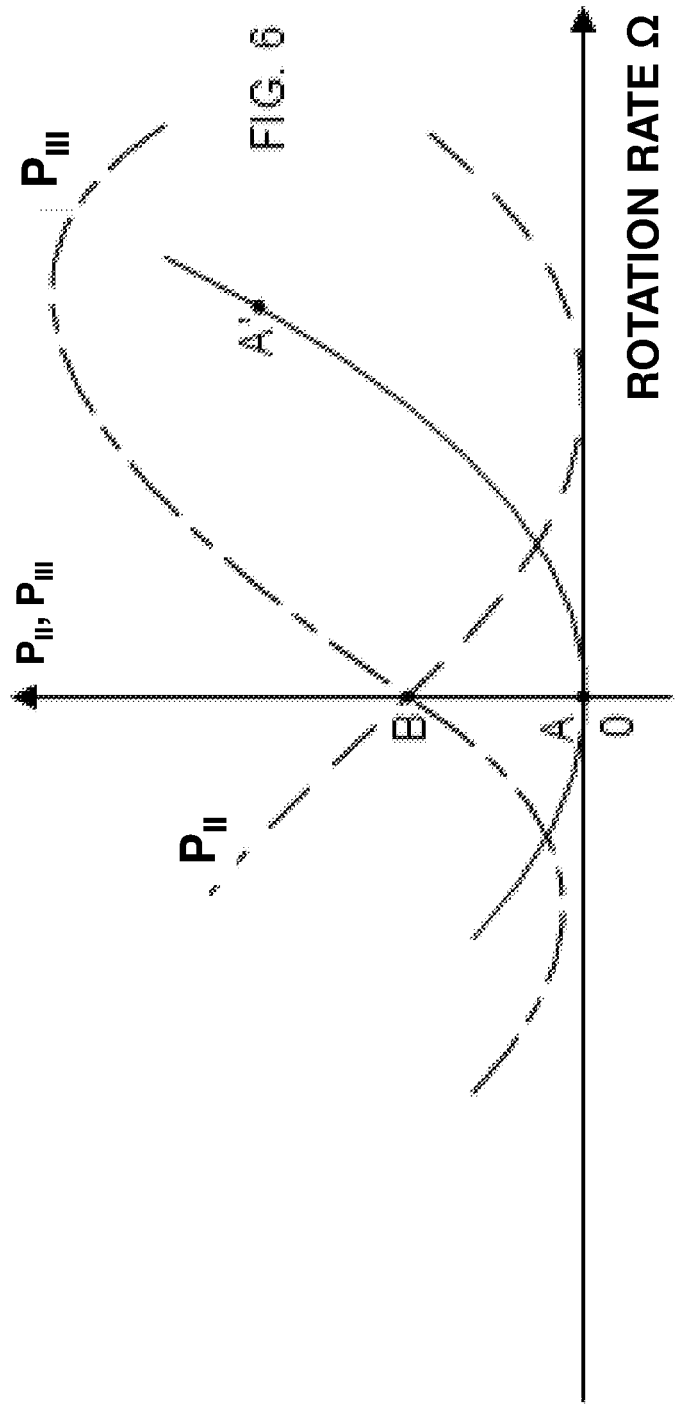

FIG. 2b-1 shows the anticipated power output as a function of degree rotation for a 3×3 coupler compared with two 2×2 coupler arrangements.

FIG. 2b-2 shows the anticipated power output as a function of rotation rate for a 3×3 coupler compared with two 2×2 coupler configurations.

Figure 3A:
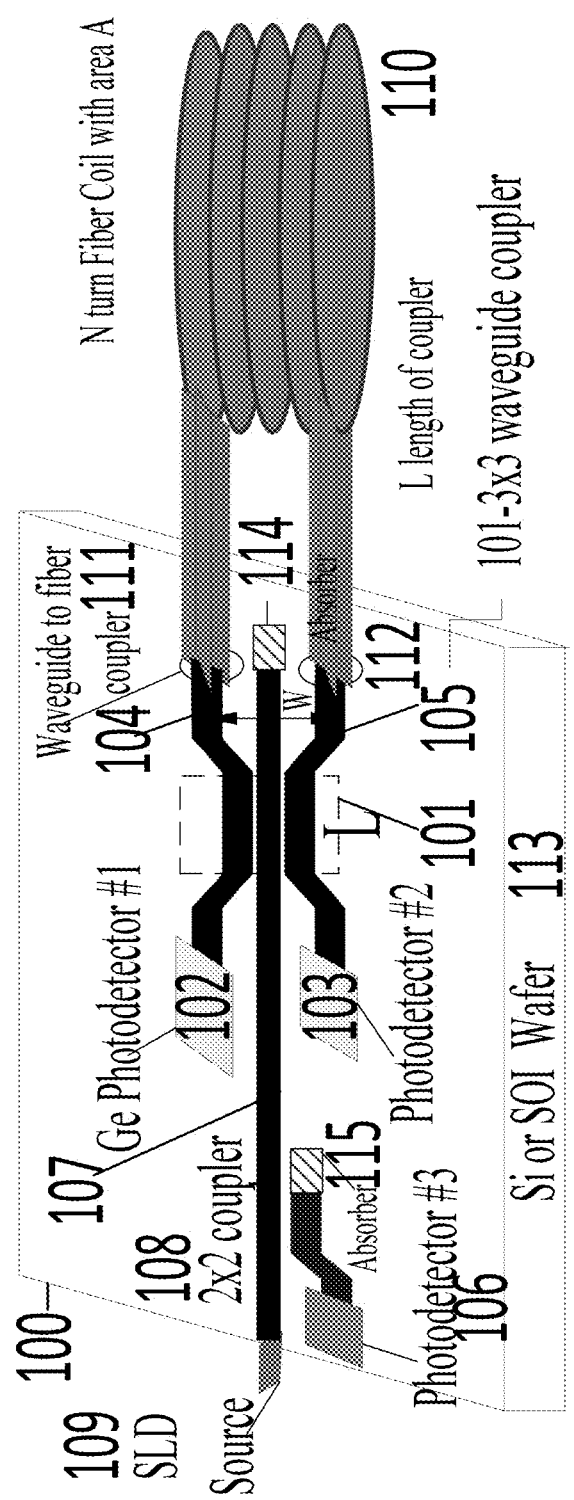
FIG. 3a shows an on-chip integrated IP-FOG using a 3×3 direction coupler with two in-line Ge photodetectors (PDs 1 & 2) to detect power in outer waveguides, and third photodetector PD#3 directionally coupled to the central guide. A SLD is also shown.

FIG. 3a shows an on-chip integrated photonic (IP)-fiber optic gyroscope 100 (FOG) realized on a substrate 113 constructed from Si, SOI and other materials. It comprises a 3×3 direction coupler 101 (formed by three waveguides 104, 105, and 107 in the region where inter-waveguide separation is such as to couple light among waveguides) which is implemented on the substrate 100. The two waveguides 104 and 105 are coupled with two in-line Ge photodetectors 101 and 102 (PD #1 & PD2) to detect power. The third photodetector 106 (PD#3) is directionally coupled to the central guide 107 using a 2×2 coupler 108. A super-luminescent light emitting diode (SLD) 109 is also shown. Ends of waveguides 104 and 105 in the section outside of the 3×3 coupler region are coupled to the fiber coil 110. The fiber used in constructing the fiber coil 109 has a core, cladding, and a sheath (made of polymer or other materials). In one embodiment, the cross-section of waveguides at the waveguide to fiber coil coupling ends 111 and 112 could be designed to match the core of the fiber coil 110. There are standard techniques in the literature regarding fiber to chip couplers (reference: J. K. Doylend and A. P. Knights, IEEE J. Selected Topics in Quantum Electronics, Vol. 12, #6, pp. 1363-1370, 2006). In one embodiment, the two ends of fiber coil core are placed in etched regions created in the host wafer 100 to place in proximity of waveguides 104 and 105 to promote light coupling with minimal insertion loss. The end of central waveguide, opposite to SLD 109 is interfaced with an absorber 114 to eliminate scattering of light traveling outside of the 3×3 coupler 101. In one embodiment, a waveguide arm of the 2×2 directional coupler 109 is interfaced with the absorber region 115, particularly the waveguide whose other end is interfaced with PD3 106.

Figure 3B:
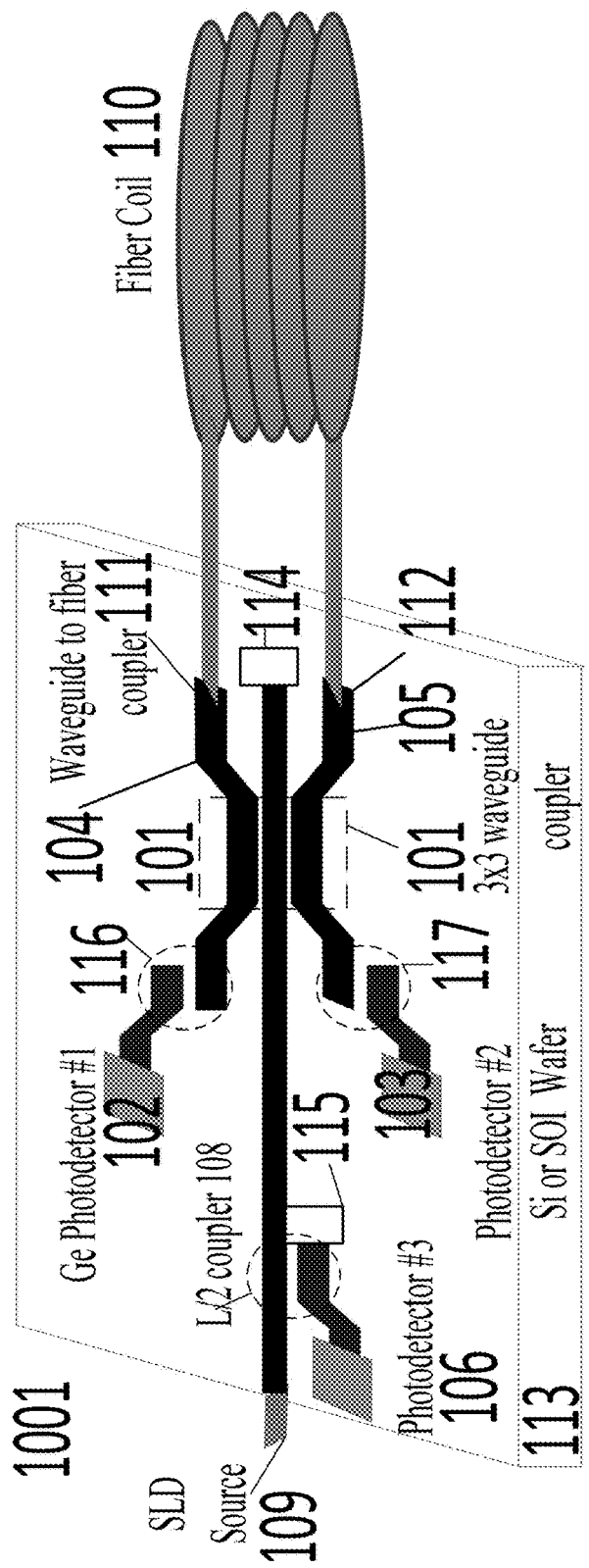
FIG. 3b shows an on-chip integrated IP-FOG using two laterally coupled photodetectors at outputs of two outer waveguides of the 3×3 coupler.

FIG. 3b shows an on-chip integrated photonic (IP)-fiber optic gyroscope (FOG) 1001 using two photodetectors 1020 and 1030 directionally coupled using two 2×2 couplers 116 and 117, respectively, at outputs of two outer waveguides 104 and 105 forming the 3×3 waveguide coupler 101. Here, these two photodetectors 1020 and 1030 are not in-line or butt-coupled. Arrangements of growing Ge layers on Si or SOI substrate 113 are shown in FIG. 11b. Also shown is a directionally coupled photodetector coupled by a 2×2 waveguide directional coupler.

Figure 4A:
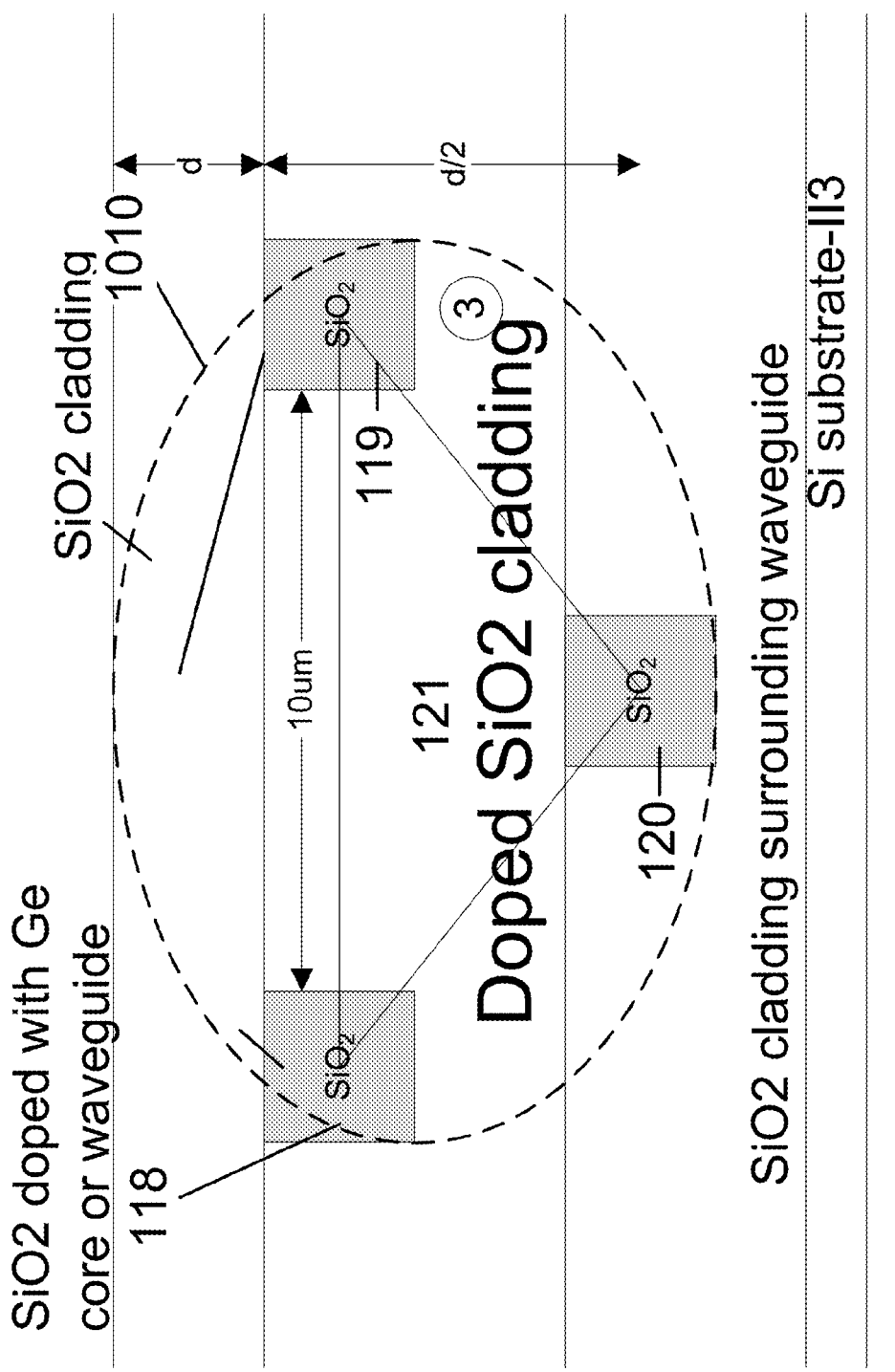
FIG. 4a shows cross-sectional schematic of a non-coplanar SiO2-based 3×3 coupler realized on Si substrate.

FIG. 4(a) shows cross-sectional schematic of a non-coplanar $SiO_2$-based 3×3 coupler 1010 realized on Si substrate 113. Non-coplanar waveguides with low index of refraction contrast (Δn) between waveguides (118, 119, 120) and cladding layers or regions 121 provides very small or negligible birefringence and other factors which result in non-reciprocal behavior. In one embodiment, SiO2 doped with Ge is used as a waveguide with cladding layers implemented using B or P doped SiO2. Other combination of oxides can be used on Si substrate.

Figure 4B:
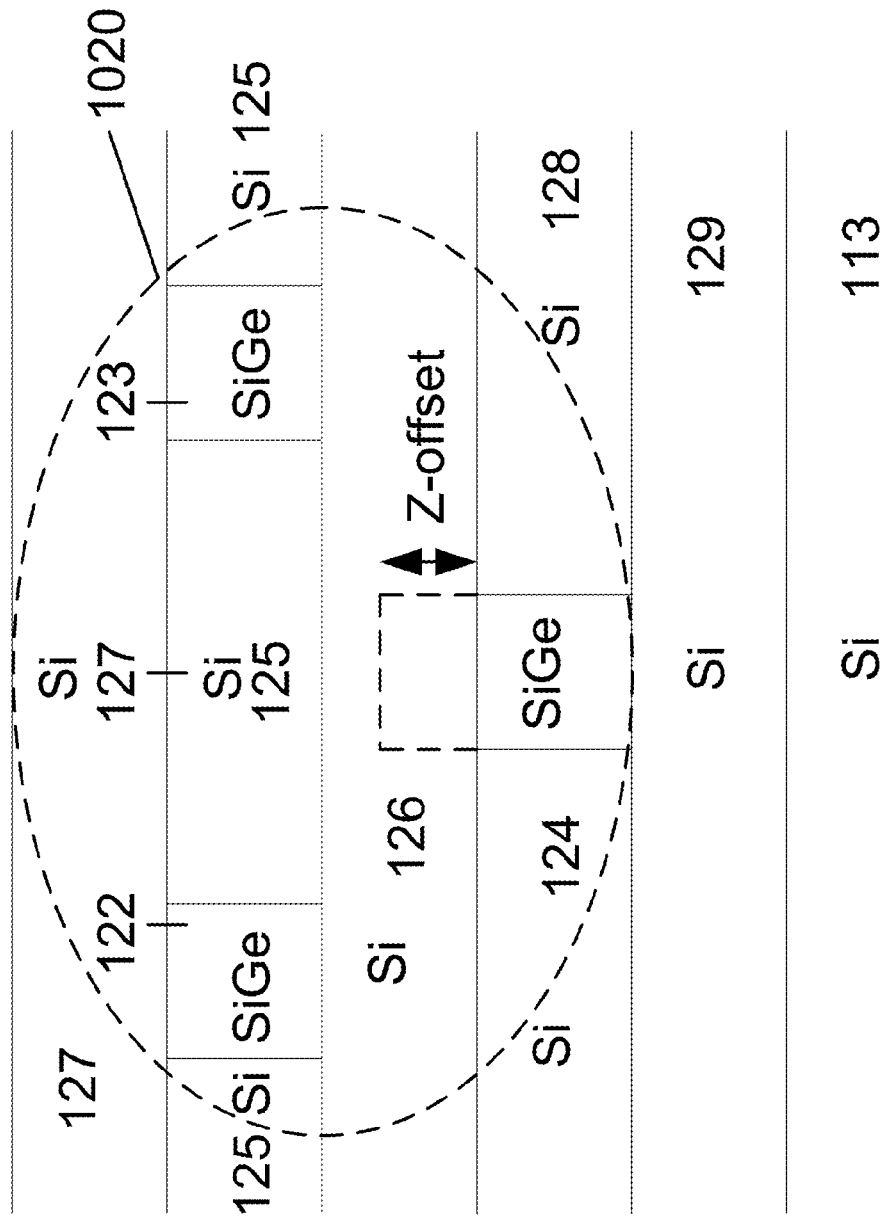
FIG. 4(b) shows cross-sectional schematic of a SiGe non-coplanar 3×3 coupler structure with Z-offset.
Figure 4C:
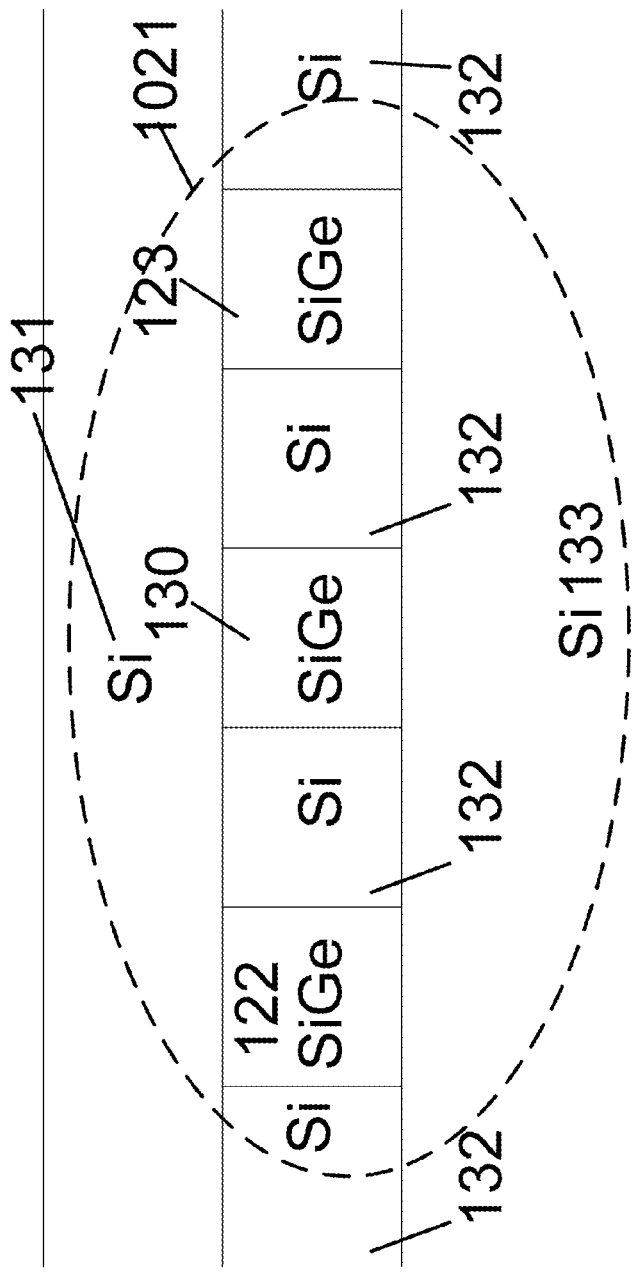
FIG. 4c shows a co-planar SiGe waveguide-based 3×3 coupler.
Figure 4D:
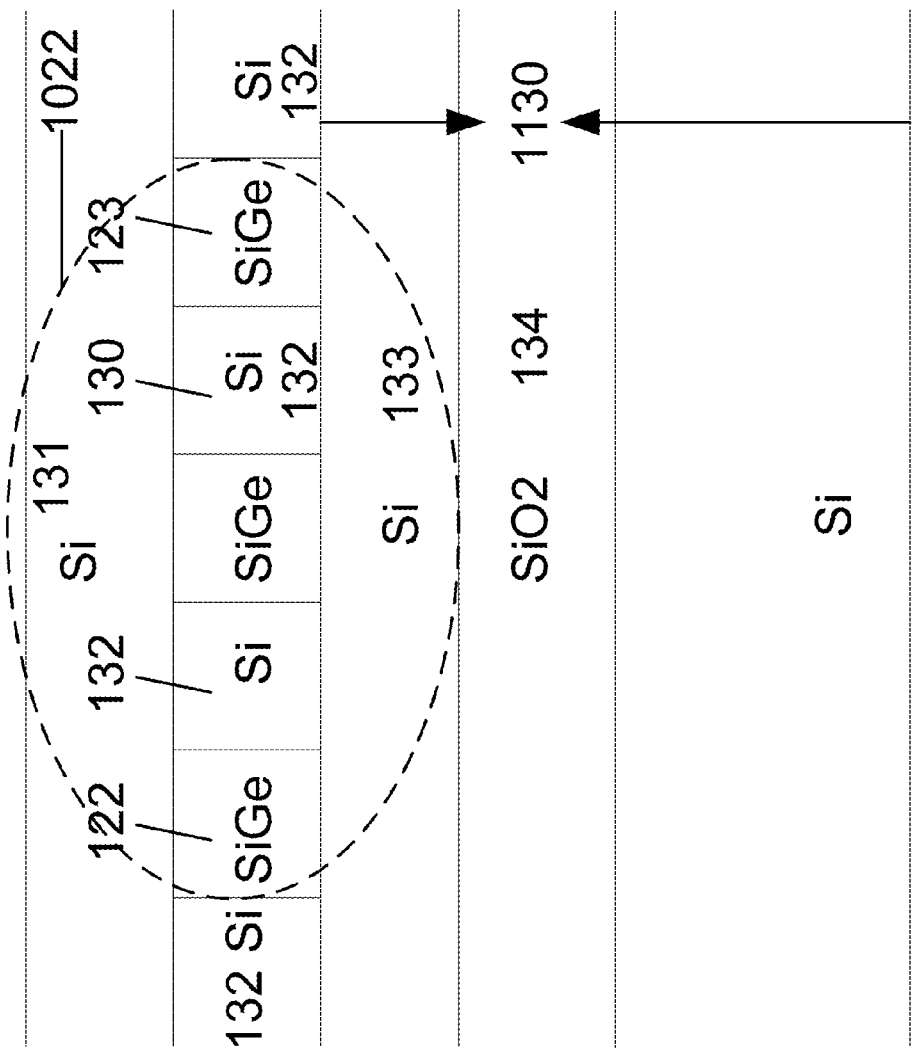
FIG. 4(d) shows cross-sectional schematic of a SiGe coplanar 3×3 coupler on Si-on-Insulator (SOI) substrate.

FIG. 4(b) shows cross-sectional schematic of a SiGe non-coplanar 3×3 waveguide coupler 1020 structure with Z-offset. The placement of three SiGe waveguides 122, 123, and 124 and their separation along vertical or z-axis determines the performance of the gyroscope 1020. The z-offset depends on the waveguides characteristics. Here the SiGe waveguides are separated by Si layers 125, 126, and 127 serving as the claddings on all sides. The substrate could be Si 113 or Si on Insulator SOI. In one embodiment, the Si cladding could be realized by amorphous Si layers.

FIG. 4(*c*) shows cross-sectional schematic of a SiGe coplanar 3×3 waveguide coupler 1021 on Si substrate 113. Here, the three SiGe waveguides 122, 123, and 130 are all in one plane. These waveguides are surrounded by various Si layers labeled as 132, 131, and 133. The substrate 113 is shown as a Si substrate. The Si cladding layers could be selected from single crystalline, polycrystalline or amorphous materials.

FIG. 4(*d*) shows cross-sectional schematic of a SiGe coplanar 3×3 waveguide coupler 1022 on Si-on-Insulator (SOI) substrate 1130. In one embodiment where SiGe is used as a waveguide layer, the Si layer around it serving as the cladding could be an amorphous Si or crystalline Si layer. The SiO2 box oxide layer 134.

Figure 5A:
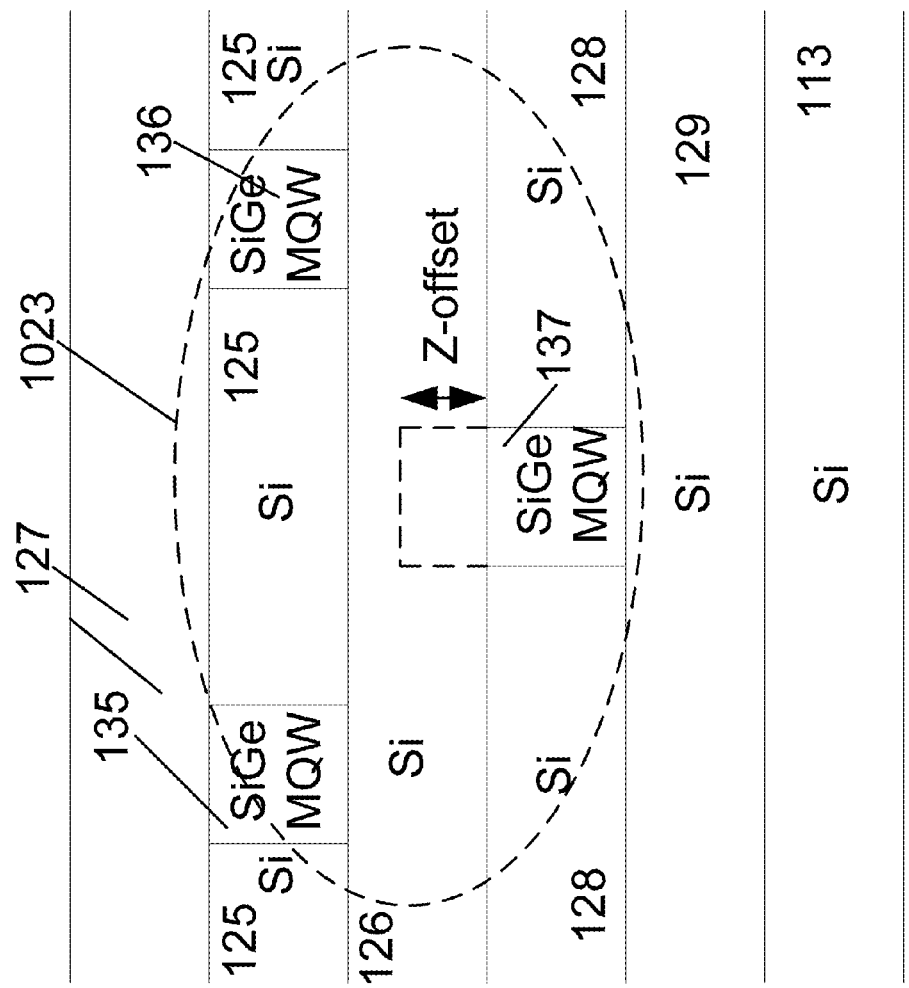
FIG. 5a shows schematic cross-section of a SiGe multiple quantum well (MQW) waveguide-based non-coplanar 3×3 coupler.

FIG. 5*a* shows schematic cross-section of a SiGe multiple quantum well (MQW) waveguide-based non-coplanar 3×3 waveguide coupler 1023. The three waveguides that form the coupler are 135, 136 and 137. The quantum well and barrier widths and composition example is described in FIG. 6*b*. Variations in well and barrier thicknesses as well as their composition can be tuned to optimize a waveguide coupler structure.

Figure 5B:
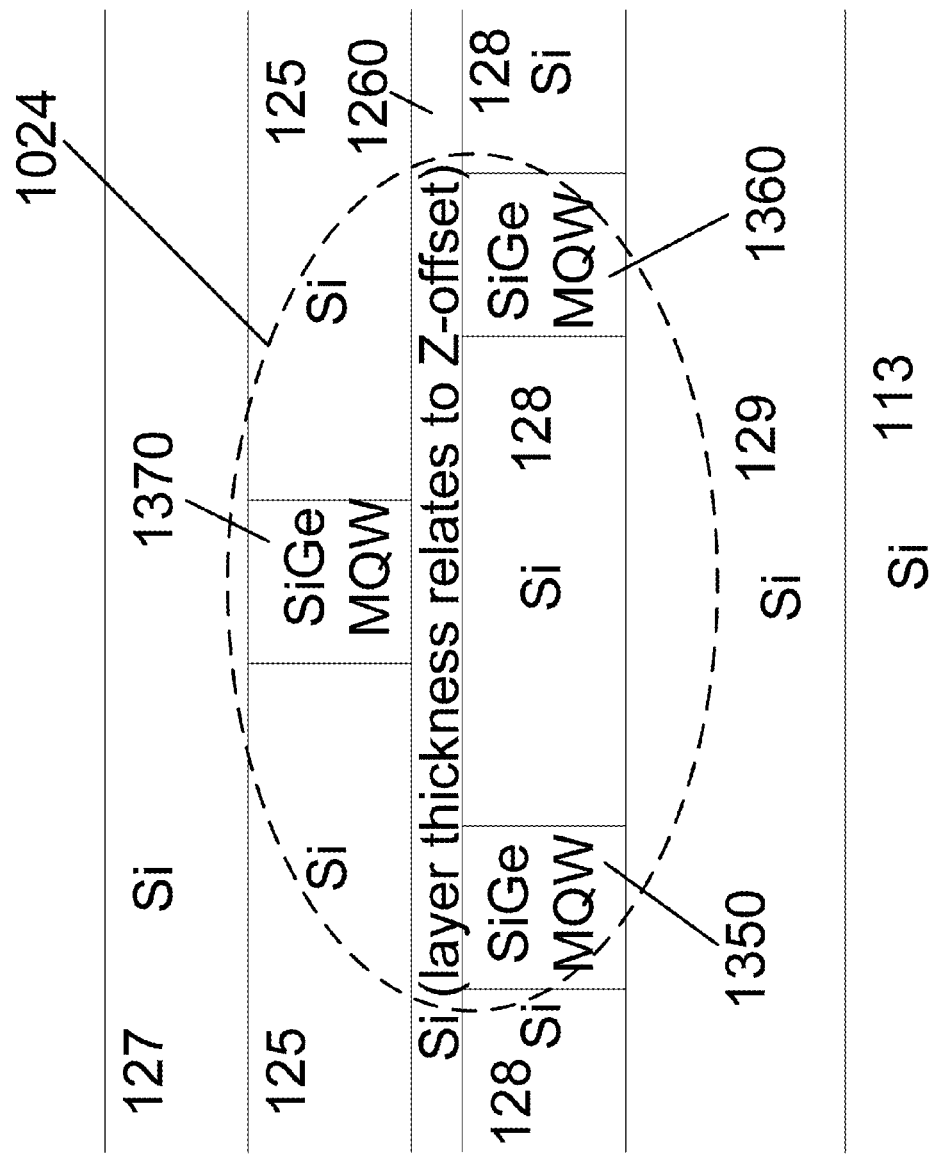
FIG. 5b shows another embodiment of a non-coplanar with one waveguide in the top layer and two in the bottom layer.

FIG. 5*b* shows one embodiment of a non-coplanar MQW waveguide coupler 1024 with one waveguide 1370 at the top and two 1350 and 1360 in the bottom. The cladding Si layers are 127, 125, and 128. Layer 1260 is the layer which determines the z-axis offset. The bottom cladding f or waveguides 1350 and 1360 is Si layer 129 which is built on substrate 113. The substrate could be SOI in an embodiment.

Figure 6A:
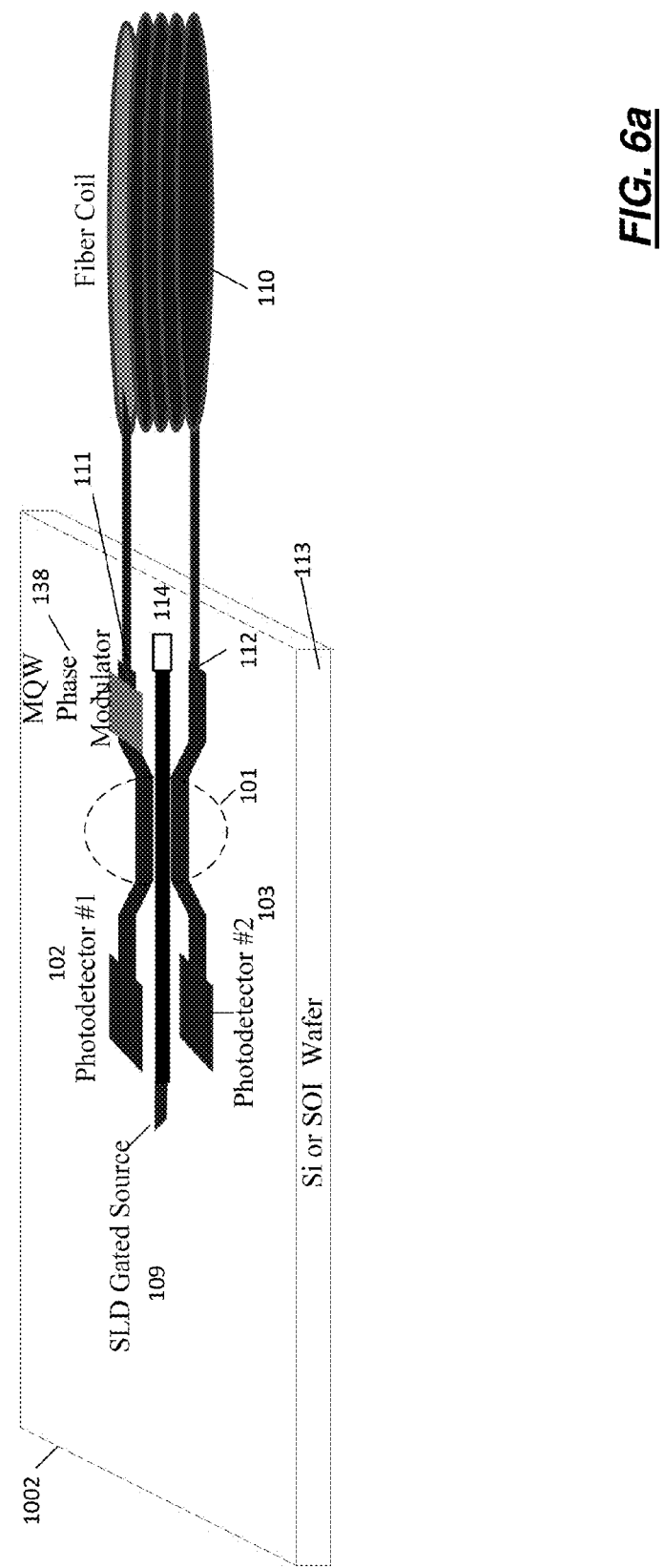
FIG. 6a A Si integrated 3×3 non-coplanar SiGe waveguide coupler, MQW phase modulator, a super-luminescent diode (SLD) gated source, and two photodetectors with a fiber coil (shown without cladding as in FIG. 3).

FIG. 6*a* showing a FOG 1002 which integrates on Si or SOI substrate 113 a 3×3 SiGe waveguide coupler 101 (selected from 1020 or 1021 or 1023), a MQW phase modulator 138, a super-luminescent diode (SLD) gated source 109, and two photodetectors 102 and 103 with a fiber coil 110 (shown without cladding as in FIG. 3). MQW phase modulators are envisioned to use quantum confined Stark effect based devices. In one embodiment, SiGe waveguides and SiGe MQW modulator are envisioned.

Figure 6B:
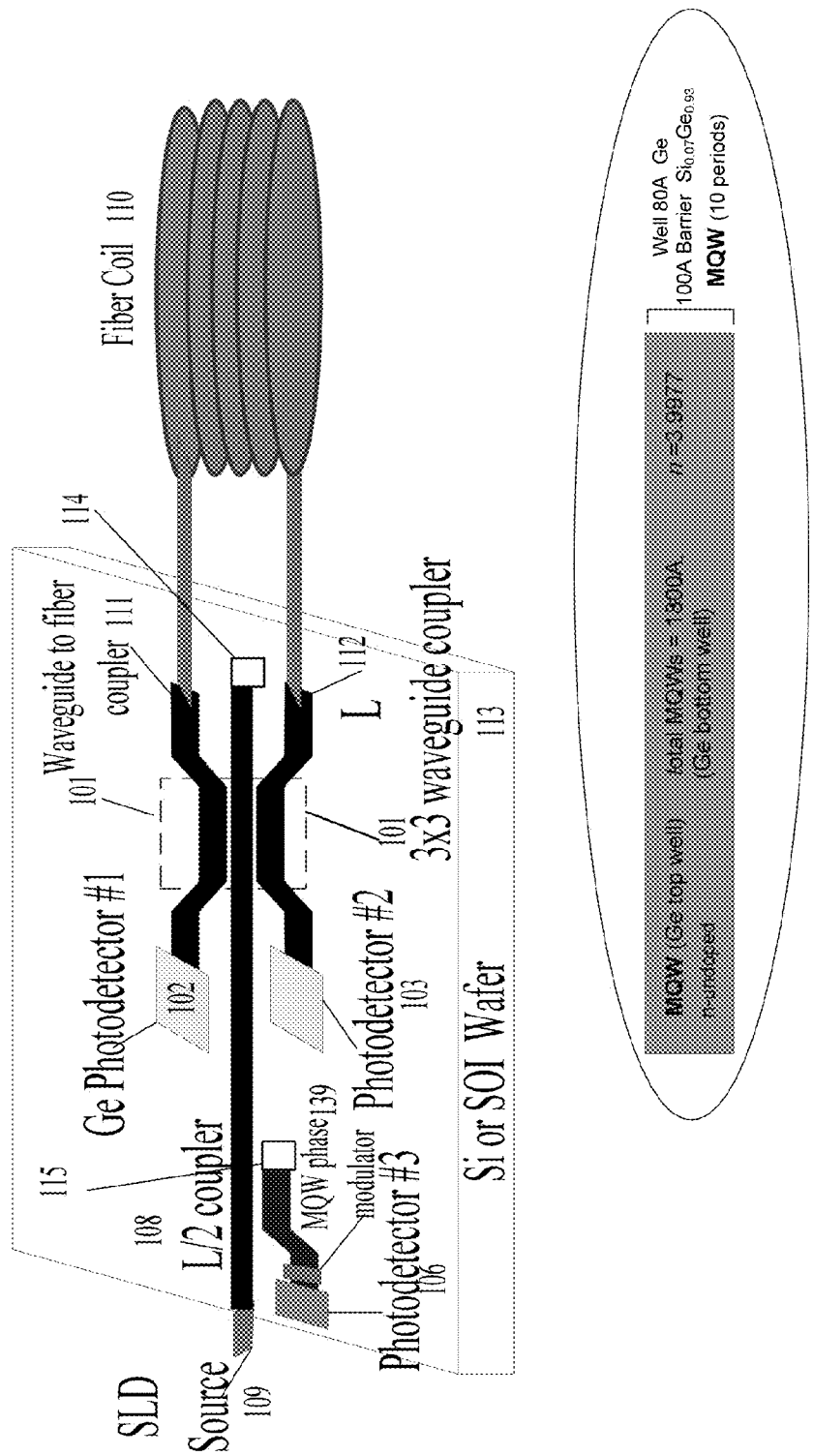
FIG. 6b shows a 3×3 coupler with 3×3 MQW waveguides, integrated phase modulator, and an additional photodetector. The elliptical inset shows the layers in the waveguide.

FIG. 6*b* shows a combination of 3×3 101 and 2×2 108 waveguide couplers. Here, the phase modulator 139 is shown in the 2×2 coupler 108. The elliptical inset shows the layers in the MQW waveguides having Ge and SiGe well and barrier layers. This configuration incorporates the flexibility of implementing 3×3 MQW waveguide couplers (1023 and 1024 shown in previous FIGS. 5*a* and 5*b*), integrated phase modulator 139, and photodetectors 102, 103, and 106. In one embodiment MQW phase modulator could be incorporated in one arm of 3×3 coupler before it is interfaced with the fiber coil 110. Still in another embodiment, we can avoid the phase modulator. The absorber regions are shown as 115 and 114.

Figure 6C:
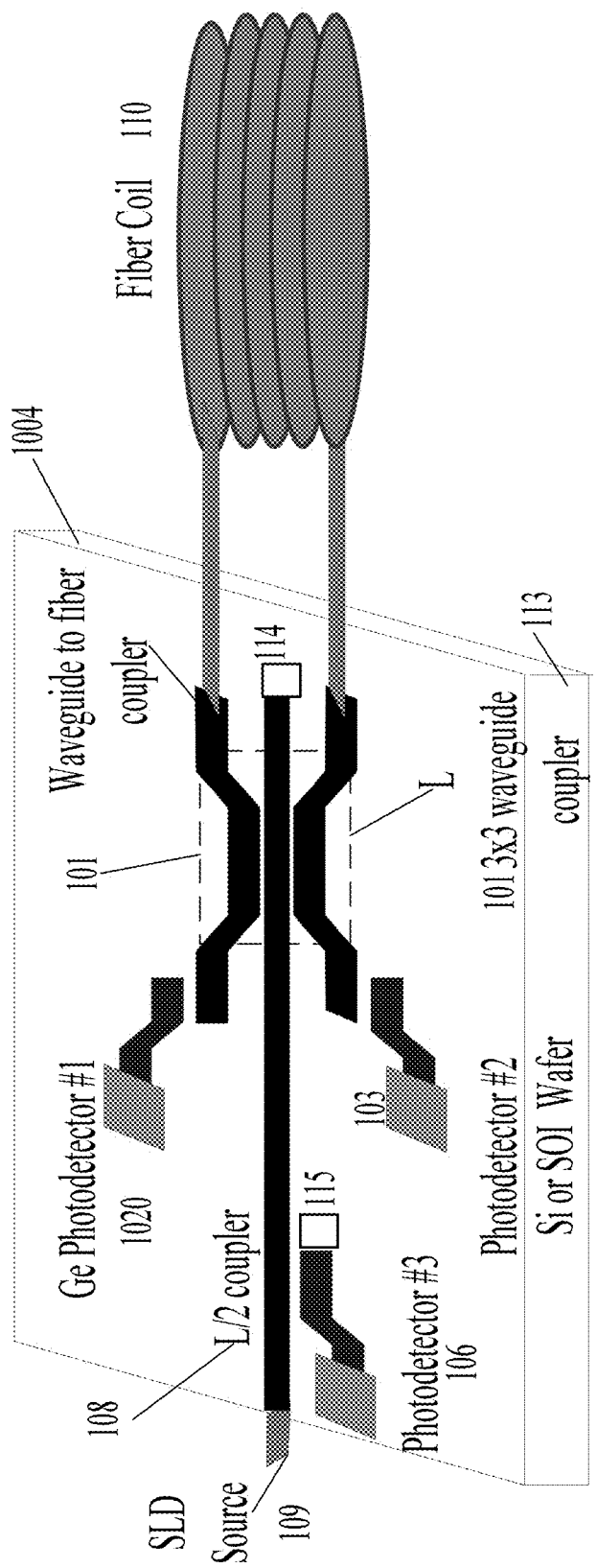
FIG. 6c shows a 3×3 coupler using two laterally coupled photodetectors.

FIG. 6*c* shows two directionally coupled photodetectors 1020 and 1030, and an inline photodetector 106. This configuration incorporates the flexibility of implementing 3×3 MQW waveguide couplers 101 (but more specifically 1023 and 1024 shown in previous FIGS. 5*a* and 5*b*) having one set of quantum well and quantum barrier thickness/separations and compositions, and another set of MQW parameters for photodetectors. Here, phase modulators are not shown, but they could be incorporated like FIG. 6*b*, if needed. The absorbers 114 and 115 are also shown. The FOG device 1004 is environed with various configurations.

Figure 7A:
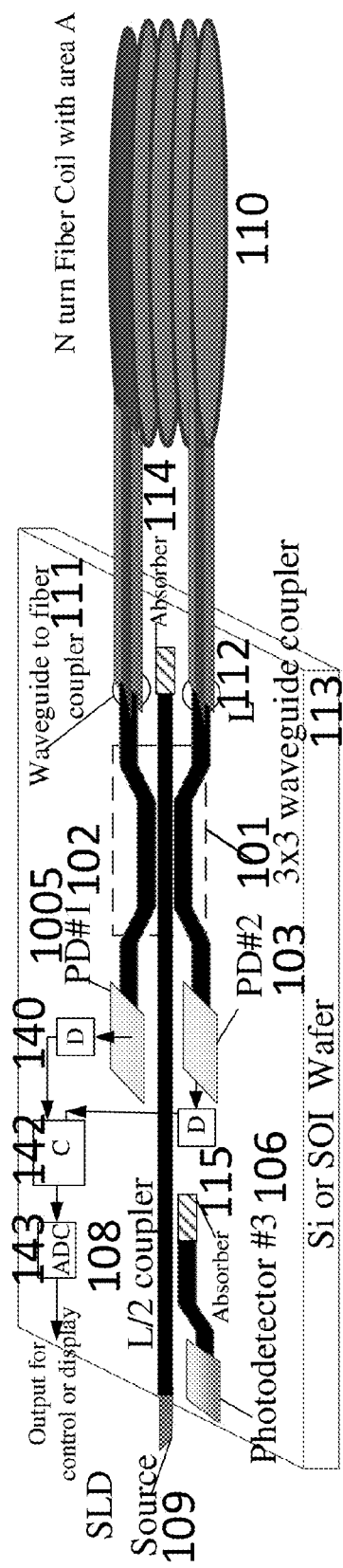
FIG. 7a shows a 3×3 coupler with a directional coupler shown with signal processing units.

FIG. 7*a* shows an embodiment of FOG system 1005 with electronics for control and display of the position of target deployment. A combination of 3×3 coupler 101 and a 2×2 directional coupler 108 are shown with signal processing units. The photodetector signals (102 PD#1 and 103 PD#2) are processed by using an Operational Amplifier (OPamp) based differentiator D (labeled as 140 and 141). This signal is fed to a comparator C 142 where an error signal is generated. This signal could be digitized using an analog-to-digital converter (ADC) 143. The error signal is a measure of any non-reciprocity in the two outer waveguides of the 3×3 coupler 101. The photodetector #3 (PD#3) 106 provides information about reciprocal signal detected in the central waveguide 107. Appropriate absorber layers 115 and 114 (also shown in other figures, and their structure may change depending on the waveguide construction) are introduced to minimize the source reflection in the central waveguide coupled to the SLD 109. Processing of ADC signal along with the Photodetector 3 (PD3) 106 signal enables the evaluation of angular velocity related to one axis or plane of coil 110. Similar information from other two FOG units (having their fiber coil units oriented along two other axes) will provide complete information regarding the motion of the platform on which FOG system is mounted.

Figure 7B:
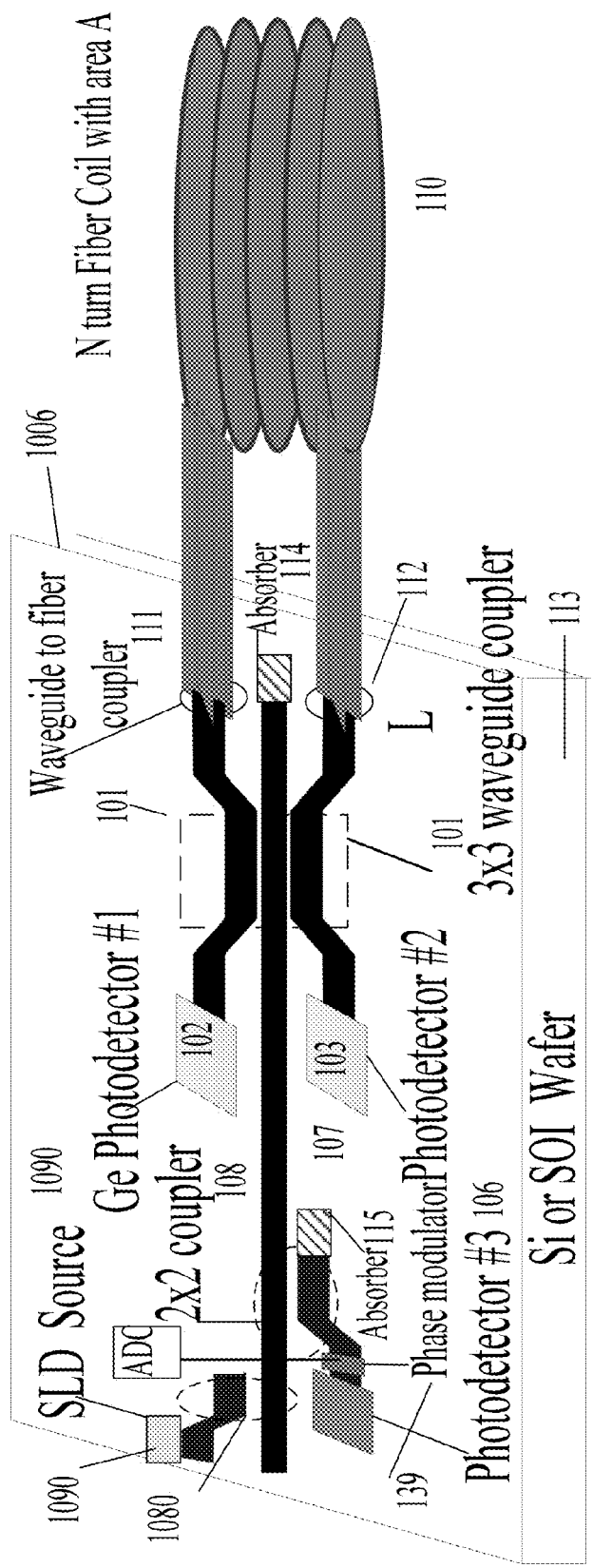
FIG. 7b shows a signal processing unit with integrated SLD chip. Here the electronic feedback circuits provide the signal to the phase modulator in proximity of photodetector PD#3 waveguide.

FIG. 7*b* shows an embodiment of FOG system 1006 where a SLD device 1090 is integrated on the same substrate 113 using a direction coupler 1080. In this embodiment we show a phase modulator 139 in the 2×2 coupler 108. The processing of signal from two photodetectors 102 and 103 is similar to FIG. 7*a* (here the electronics blocks are shown explicitly). The output from ADC unit is used to control the phase modulator 139 in the 2×2 coupler (which is inserted before PD#3 106). The absorber regions are also shown 115 and 114. The phase modulator 139 could be realized in Multiple Quantum Well waveguides described before, and will provide additional design flexibility in case the fiber coil 110 or other components have some nonreciprocal scattering. We envision gating of the SLD light source 1090, if needed. The duration of the light pulses produced by the SLD 1090 will be controlled by signal from the ADC 143 output.

Figure 8A:
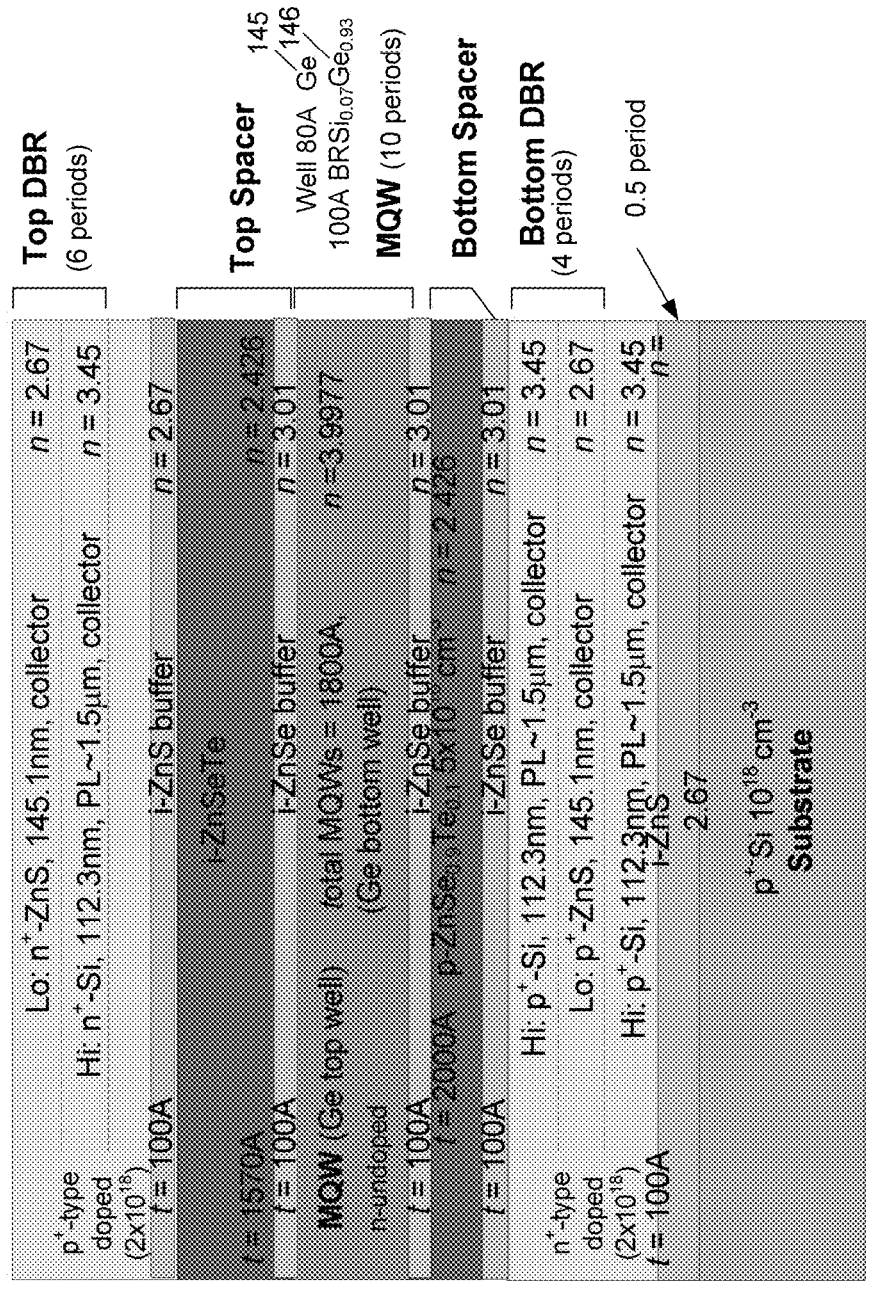
FIG. 8a shows a schematic block diagram of a Fabry-Perot configured Ge multiple quantum well photodetector for detecting light traveling normally to the coupler waveguides.

FIG. 8*a* Schematic of Fabry-Perot configured Ge multiple quantum well photodetector 10200 (replacing 102 in FIG. 6*b*) for detecting light traveling normally to the coupler waveguides. Here, this design required using a mirror at the termination of the waveguide to direct the light upwards into the detectors 1020 and 1030 (replacing 103).

Figure 8B:
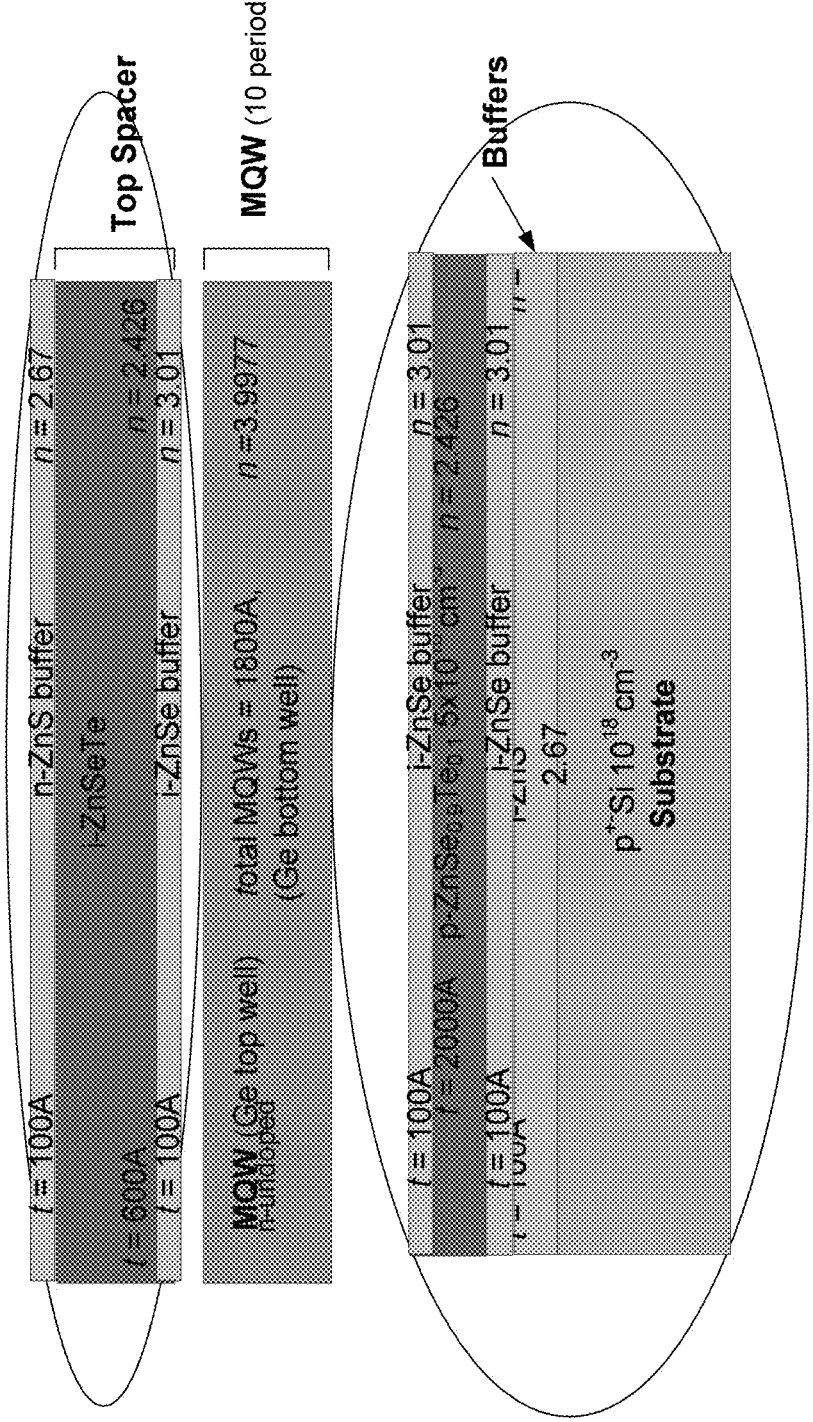
FIG. 8b shows a schematic block diagram of a Ge multiple quantum well structure that can be used as a photodetector as well as a modulator.

FIG. 8*b* Schematic of Ge multiple quantum well structure that can be used as a photodetector as well as a multiple quantum well phase modulator 139. However, as noted before the compositions of modulator and detectors may be different. In one embodiment, the phase modulator is realized using Stark effect modulator using multiple quantum wells with Ge well and SiGe or GaAs or InGaAsP barriers if the technology permits. Note all three sections are on top of each other in a contiguous fashion.

Figure 8C:
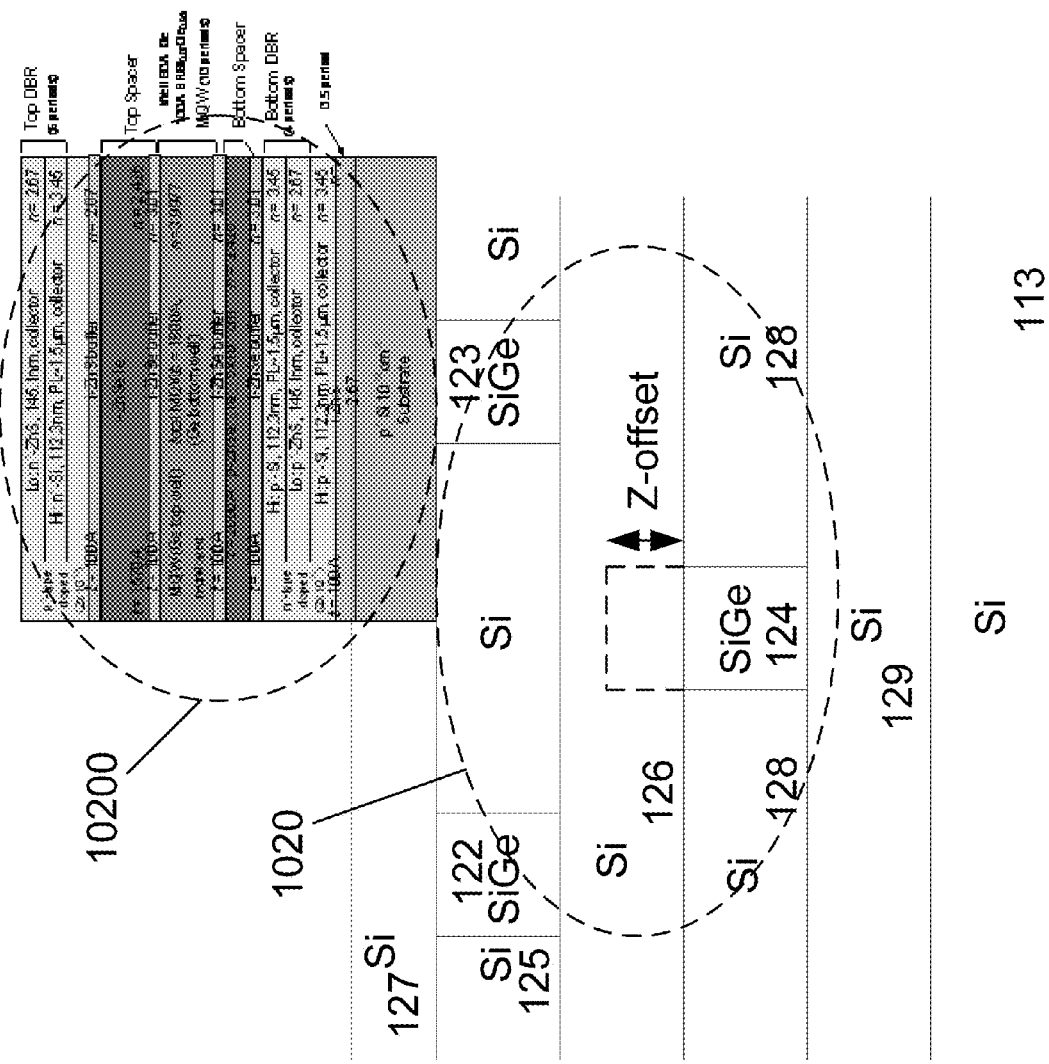
FIG. 8c shows a schematic integration of Ge photodetector-cum-modulator on a SiGe non-coplanar 3×3 coupler.

FIG. 8*c*. Schematic integration of Ge photodetector 10200 on a SiGe non-coplanar 3×3 coupler 1020 similar to the one shown in FIG. 4*b*. In one embodiment the phase modulator 139 (FIG. 7*b*) can be implemented in a similar way.

Figure 9:
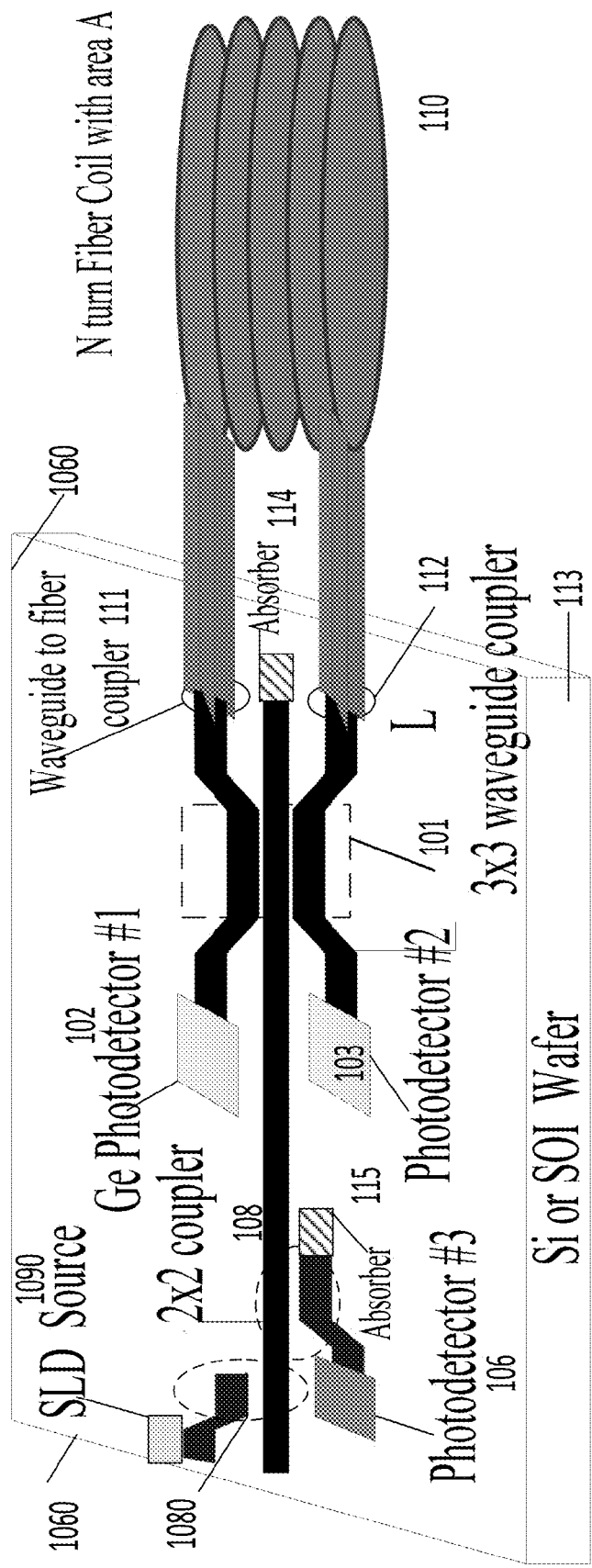
FIG. 9 shows an integrated InGaAs-on-Si light emitting source (SLD).

FIG. 9 Integrated InGaAs-on-Si light emitting source (SLD) 1090 using a 2×2 directional coupler 1080. Here, InGaAs based laser structure is envisioned which is grown on Si layer. The details of this structure are shown in FIGS. 10 and 11.

Figure 10:
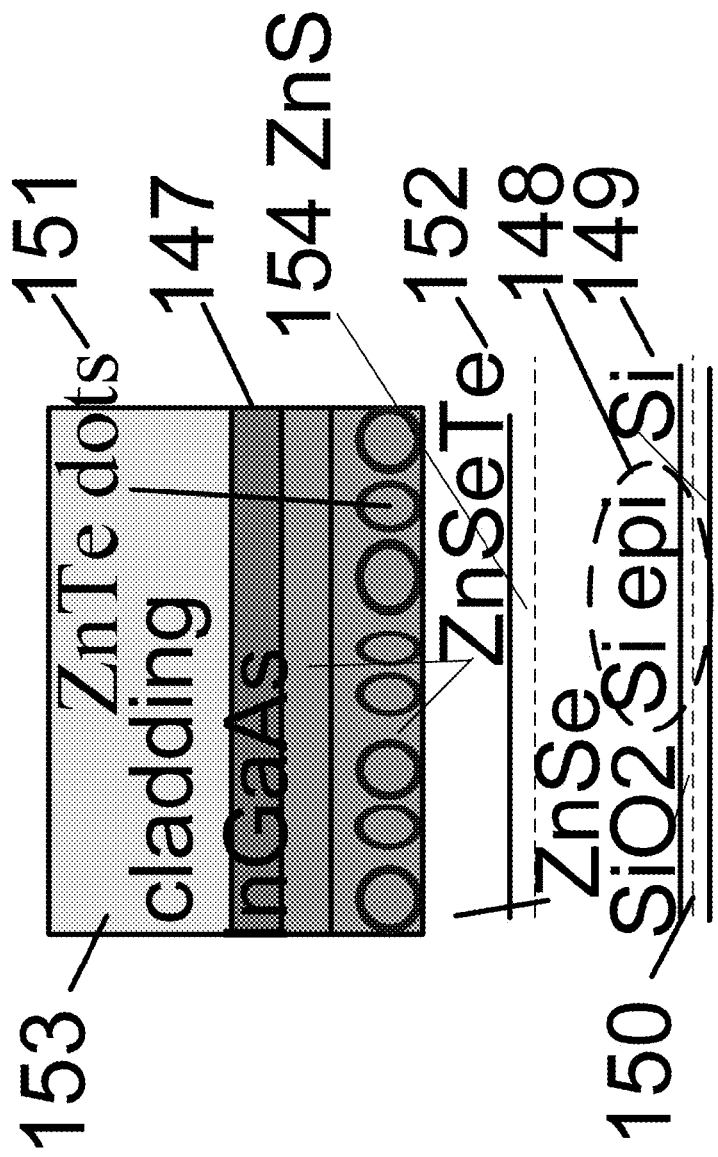
FIG. 10 shows schematically how an epitaxial InGaAs layer is grown on Si epi (in turn grown as Si-On-Insulator SOI) using ZnTe quantum dot mediated nanointerface.

FIG. 10 shows schematically how an epitaxial InGaAs layer 147 is grown on Si epi 148 (in turn grown as Si-On- Insulator SOI comprising of Si 149 and SiO2 150) using ZnTe quantum dot 151 mediated nanointerface (Reference 12) resulting in ZnSeTe layer 152. The laser structure is not shown except for the top cladding layer 153. The ZnS buffer is 154.

Figure 11A:
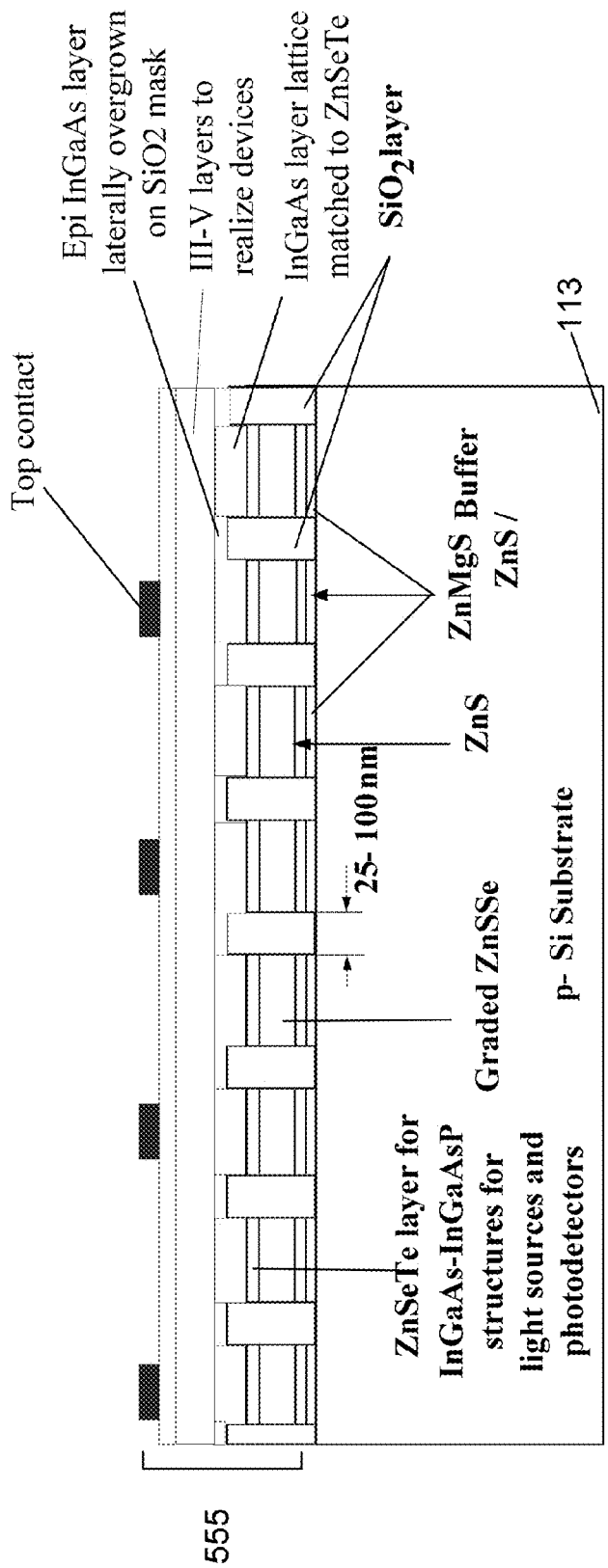
FIG. 11a shows a schematic block diagram of an III-V layers (such as InGaAs, InGaAsP, InP, AlInAs) grown on Si substrate to implement light-emitting diodes and lasers, photodetectors, and waveguides and waveguide couplers.
Figure 11B:
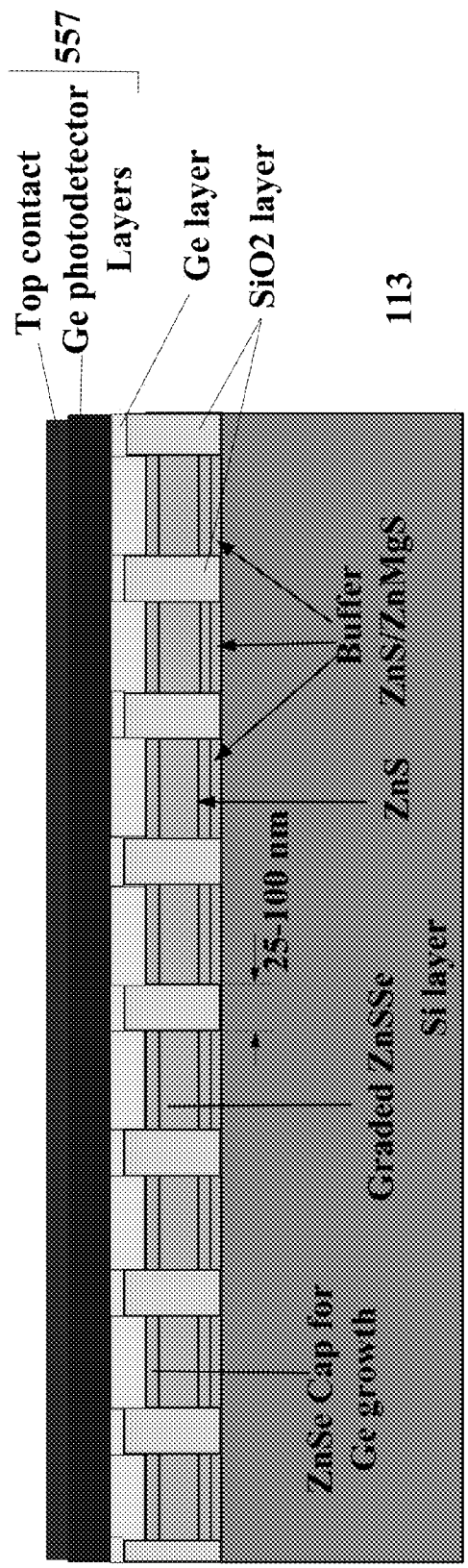
FIG. 11b shows a schematic block diagram of Ge, SiGe layers grown on Si substrate.

FIG. 11a Schematic of an III-V layers (such as InGaAs, InGaAsP, InP, AlInAs) grown on Si substrate to implement light-emitting diodes and lasers, photodetectors, and waveguides and waveguide couplers. The III-V structure is grown on islands surrounded by SiO2 on a Si substrate using ZnS/ZnSeTe epitaxial layers where in-situ processing results in gliding of misfit dislocation resulting in defect minimized layers and devices and photonic integrated circuits.

In accordance with one embodiment of the invention, a method of fabricating SLD, photodetectors, and waveguides and 2×2 and or 3×3 couplers on a substrate whose lattice constant differs from the lattice constant of the said devices, and include nano-patterning of a thin masking layer including at least one of a $SiO_2$, SiON, or $Si_3N_4$ material grown or deposited on the substrate, wherein the substrate includes exposed Si regions; growing epitaxially thin buffer layers followed by a transition layer which transitions the lattice constant of the substrate on top of the buffer layers; gliding dislocations from the transition layer into SiO2 or other masking layer walls using heat treatment; performing epitaxial growth of at least one base semiconductor, above the transition layers and performing lateral epitaxial overgrowth of the base semiconductor over the thin SiO2 masking layer; and building a lattice-matched FOG chip structure on the base semiconductor layer (Si or SOI). Reference is made to published patent applications references 12, 11).

FIG. 11b Schematic of Ge, SiGe layers grown on Si substrate. Here, Ge layers can be used to implement p-n and p-i-n Ge photodiodes and avalanche photodiodes, SiGe to implement waveguides and couplers.

Figure 12A:
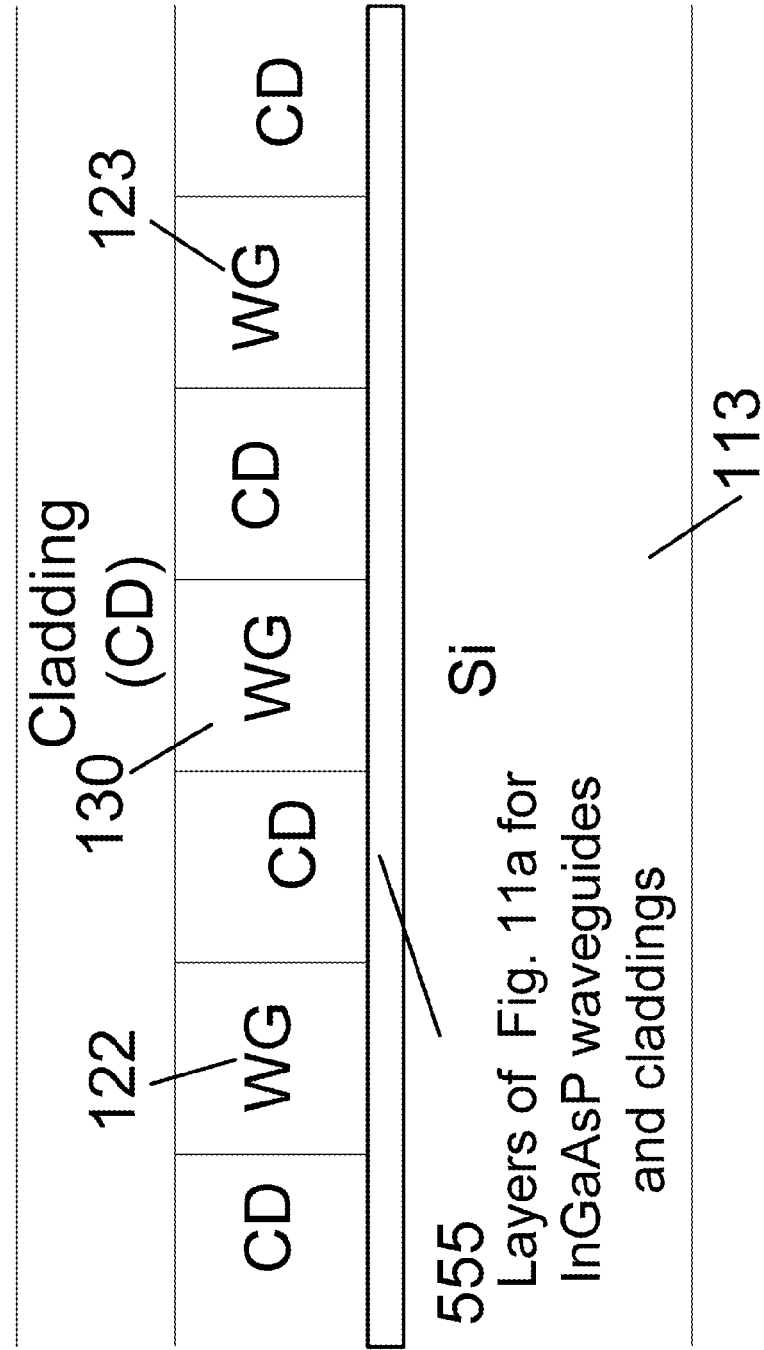

FIG. 12a Schematic illustrating an embodiment of photonic integrated circuit combining photodetectors, waveguides and couplers, and InGaAs—InGaAsP based light-emitting source, realized on a Si substrate 113 using technique shown in FIG. 11a. Here, the integrated circuit is dedicated for the application of developing a fiber coil based gyroscope. For example, CD is for cladding layer 132 (see FIG. 4c), WG is for waveguides 122, 130, and 123 (see FIG. 4c), InGaAs or InGaAsP layers 555 (see FIG. 11a). Set of layers lumped as 556 stand for device layer which depend on if Photodetector, SLS or Phase modulator is implemented. Ge layers are shown as 557 in FIG. 11b.

Figure 12B:
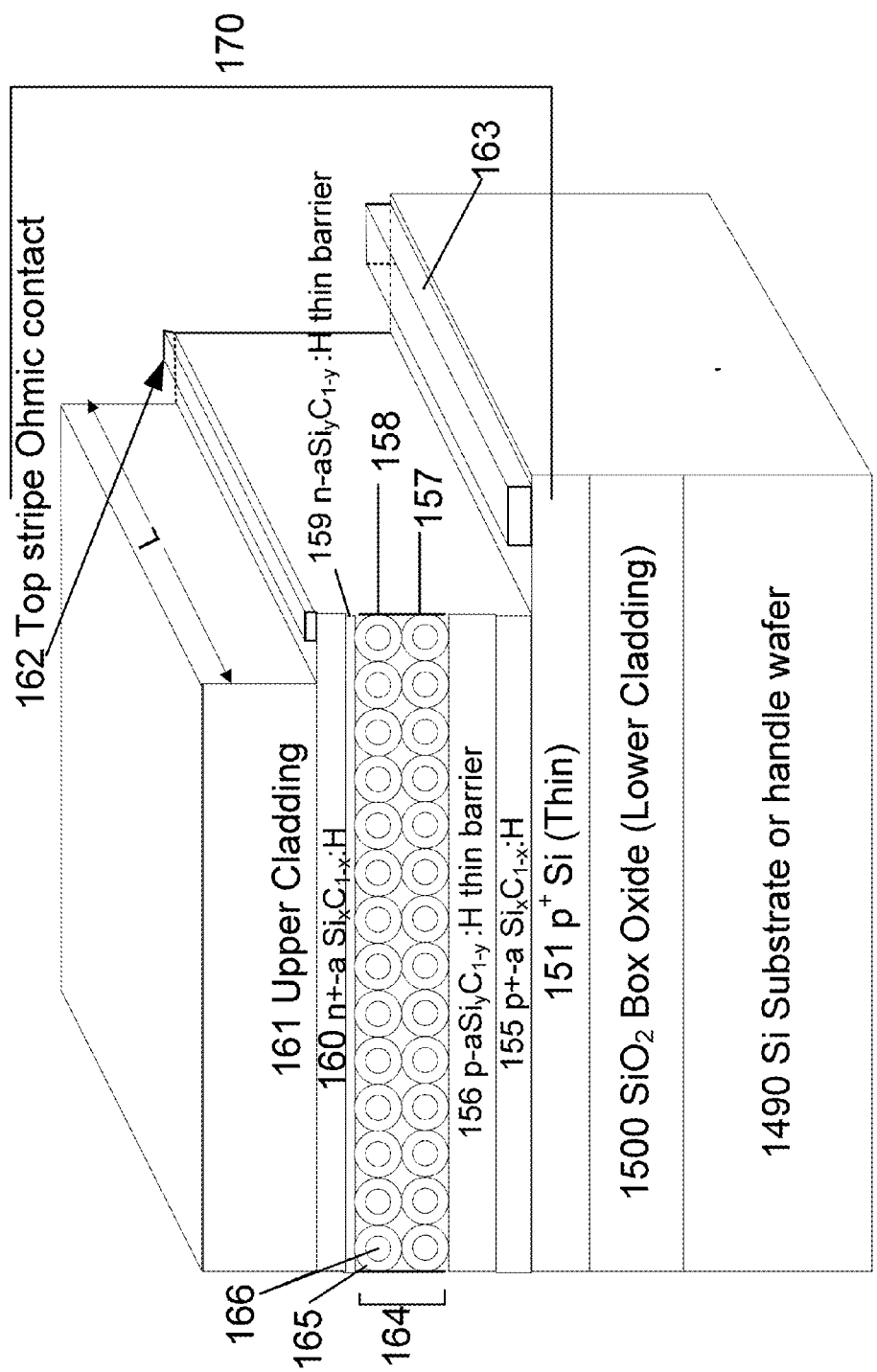
FIG. 12b shows a schematic block diagram illustrating an embodiment of light emitting diode or laser source using Ge quantum dot superlattice (QDSL) layer based structure.

FIG. 12b Schematic illustrating an embodiment of light emitting diode or laser source 139 using Ge quantum dot superlattice (QDSL) layer 164 based structure (described in reference pending patent application Reference 12). FIG. 12b shows an electrically-pumped active layer comprising of GeOx-Ge cladded dots (layer 157 and 158) forming a quantum dot superlattice (QDSL). Ge QDSL is configured as a laser diode in which lasing transitions occur via direct gap mini-bands at injection levels where narrow mini-band corresponding to the indirect gap states is filled. Here, lasing takes place in GeOx-Ge quantum dot superlattice (QDSL) active layer shown as 164 comprising of barrier layers 159 and 156. The GeOx cladding 165 is thin ~1 nm and the Ge quantum dot core 166 is ~3-6 nm. The Ge dots are self-assembled on p-Si layer 156. Layer 156 is deposited on 155 p+Si layer which is epitaxially grown on 154 or Si Si-on-insulator substrate (as shown). Here, 1490 is the substrate or handle wafer and 1500 is box oxide. In one embodiment, upper cladding 161 is selected from lower index and high energy gap layers which are compatible with barrier layers 160 and 85. The electrons are injected from n-side cladding 92 which is heavily doped. Holes are injected from p+-side layer 154. In one embodiment, layer 1500 serves as lower cladding. In other embodiments, layer 154 serves as a cladding when it has lower index of refraction than Ge and band gap such that it injects holes. GaP, GaAsP based cladding and hole injectors are also envisioned in an embodiment. The active layer comprising $GeO_x$—Ge cladded dot layers 164, barrier layers 159, and 156. The structure appears similar to that of FIG. 8a; however, a different lasing concept is used. The difference is that both electrons and holes are confined in the Ge quantum dots. The GeOx thin barriers and Ge dots in 2-dimensional or 3-dimensional array result in ultra-narrow mini energy bands corresponding to indirect and direct gap states. The injected minority carriers fill the indirect gap mini-band and overflow to mini-bands corresponding to direct gap states. This is envisioned as resulting in lasing at much lower current density than observed in Ge thin films.

Figure 12C:
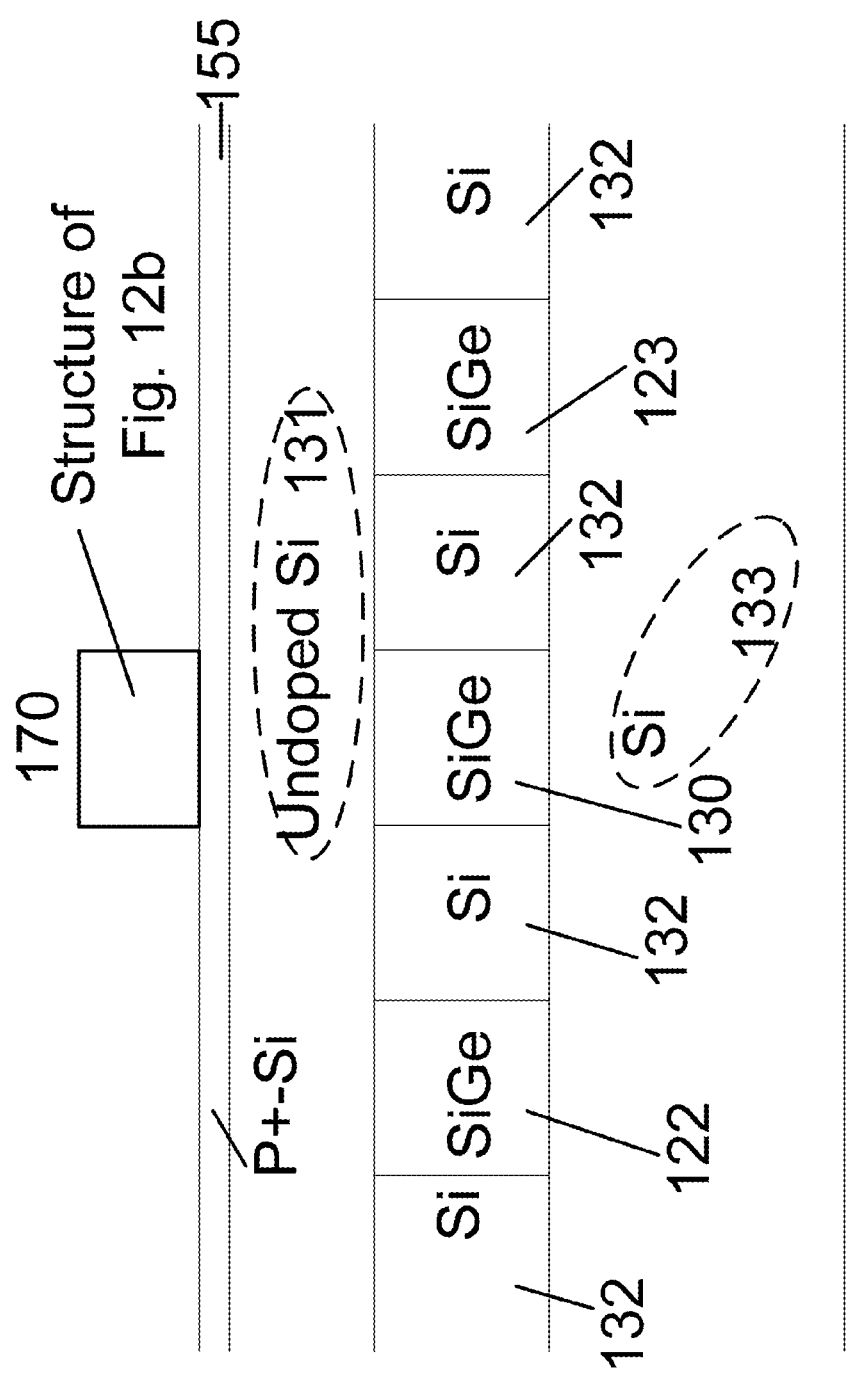
FIG. 12c shows a schematic block diagram illustrating an embodiment of photonic integrated circuit combining photodetectors, waveguides and couplers, and Ge QDSL based light-emitting source, realized on a Si substrate (such as that in FIG. 12b) using Ge on Si technique shown in FIG. 11b.

FIG. 12c. Schematic illustrating an embodiment of photonic integrated circuit combining photodetectors, waveguides and couplers, and Ge QDSL based light-emitting source 170, realized on a Si substrate (FIG. 12b) using Ge layers to realize light-emitting and photodetectors of FIG. 12b and FIG. 11b or InGaAs based layers of FIG. 11a.

Figure 13A:
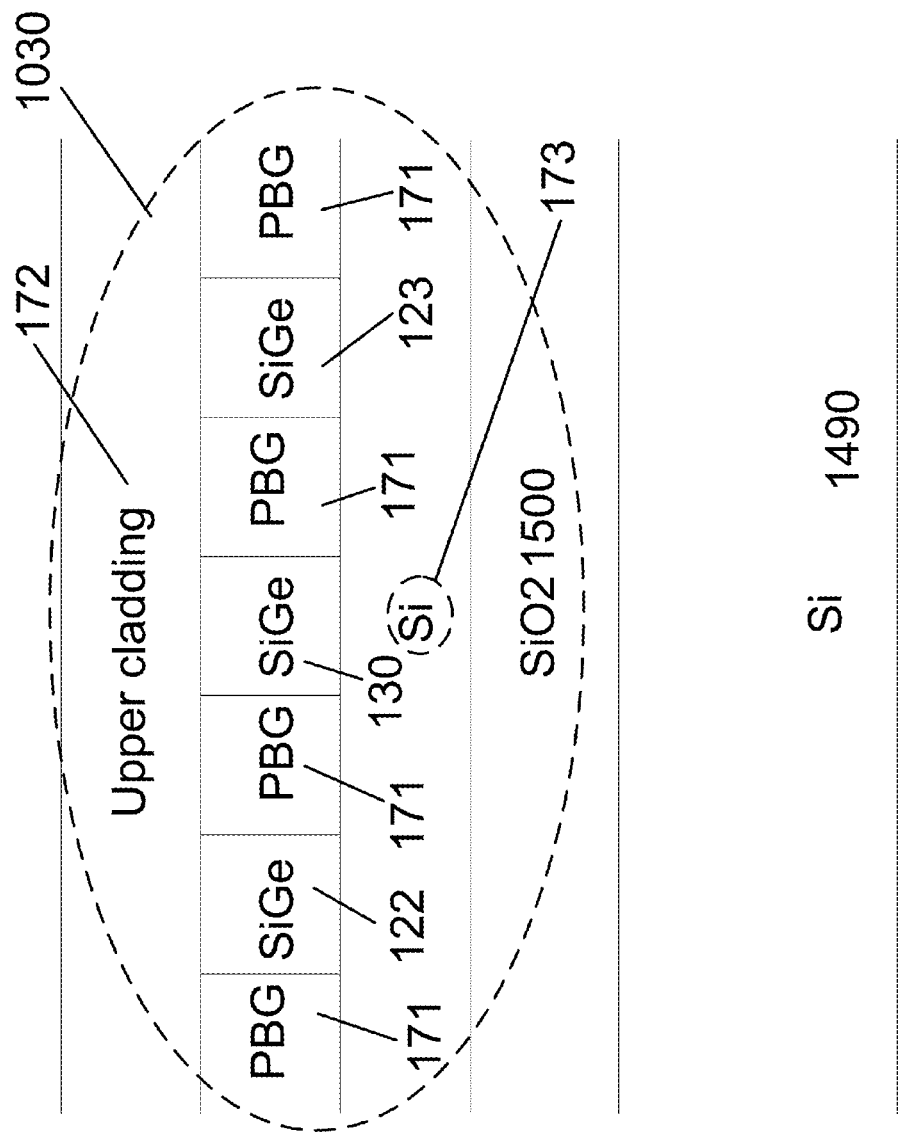
FIG. 13a shows a schematic block diagram of a waveguide coupler using Si nanophotonic with photonic band gap (PBG) structures.
Figure 13B:
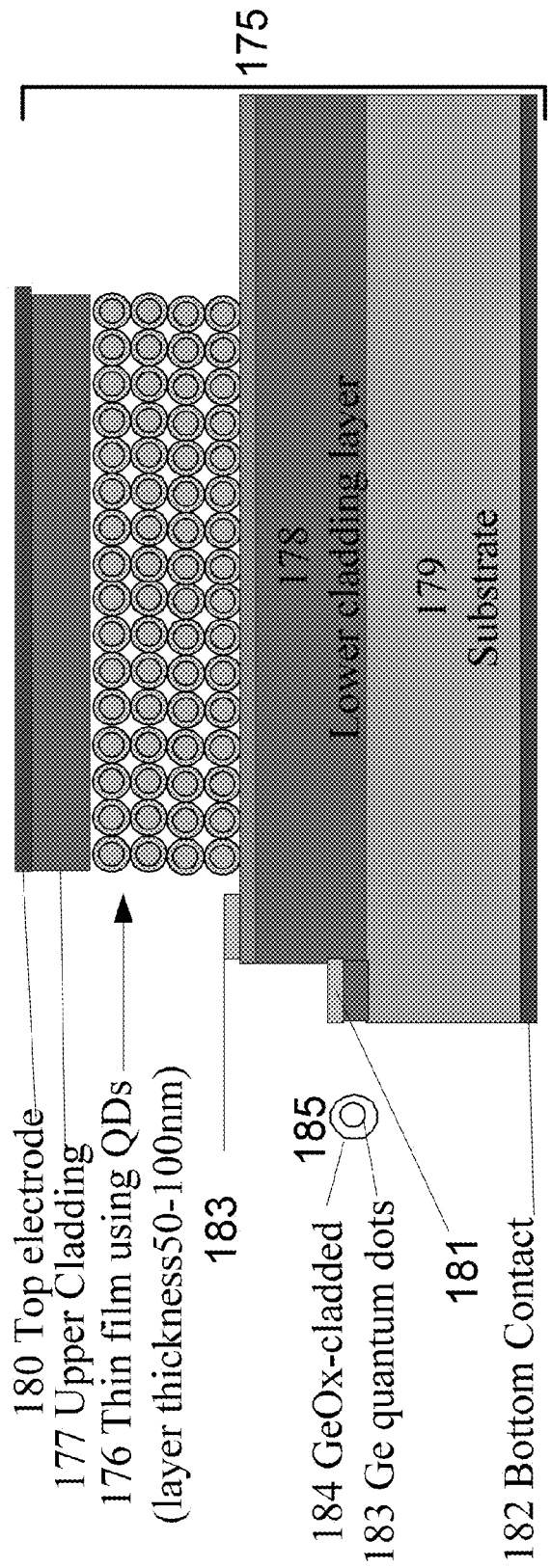
FIG. 13b. Cross-sectional schematic where cladded quantum dots (QDs) are used to form the core of waveguide and PBG configuration is used to confine the light in waveguide laterally.

FIG. 13a Schematic of 3×3 waveguide coupler 1030 using Si nanophotonic with photonic band gap (PBG) 171 structures. The PBG-based 3×3 coupler is compact. Here the three waveguides are realized using SiGe (122, 130, 123) with cladding layers 171 in the lateral direction. In the transverse direction we have upper cladding 172 and lower cladding 173. In another embodiment layer 1500 could be used for this purpose. FIG. 13b shows another embodiment where cladded quantum dots (QDs) are used to form the core of waveguide and PBG configuration to confine the light in waveguide laterally. QD based structure is compact and tunable (described in reference pending patent application Reference 10). Both configurations are flexible to incorporate QDSL based light-emitting source, photodetectors and absorbers. The substrate is shown to be Si 1490.

FIG. 13b is described in referred patent application Reference 10. It describes cross-section of a quantum dot (QD) waveguide structure 175. It comprises quantum dot waveguide layer 176, upper (or top) cladding 177, and a lower (or bottom) cladding 178. The lower cladding 178 can be realized on a substrate 179. The lower cladding may also have a thin layer 180 which is p-doped Si. This p-doped layer facilitates: (i) site-specific self-assembly of dots [3], and (ii) application of electric field across the QD layer using top electrode 180 and one of the bottom electrodes 181, 182 or 183 depending on the structure. The electric field DC and/or RF achieves changes in the electrooptic properties (such as absorption coefficient, index of refraction) of this layer for various device applications including modulators, tunable filters, tunable demultiplexers. In one embodiment, the quantum dot waveguide layer is realized by deposition of a thin film 2 (50-100 nm) comprising layers of Ge dots 183 (3-6 nm core diameter) with cladding of $GeO_x$ 184 layer (1-3 nm thick). The cladded Ge dots 1855 are assembled on lower index of refraction layer 178 or 175 (selected from materials such as Si, ZnSe or ZnS). It can be adapted as a three slab waveguide with conventional lateral confinement or as a photonic crystal waveguide using PBG structure for lateral confinement. Variations of regular waveguide, PBG waveguide, combination of 2D-PBG structures and waveguides are envisioned.

Figure 14A:
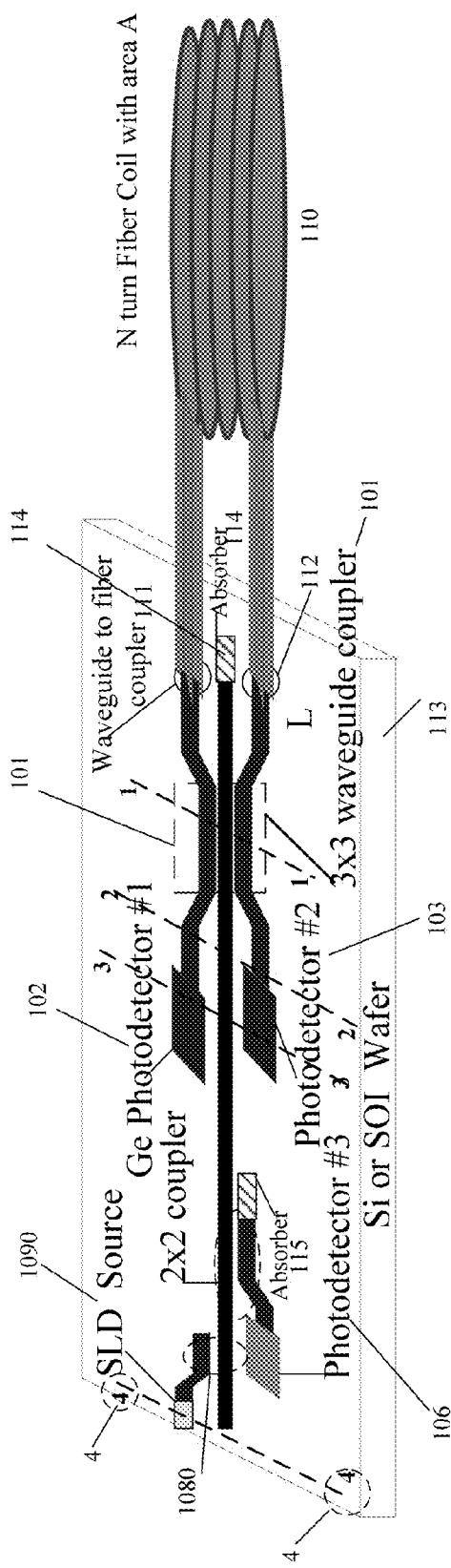
FIG. 14a shows a cross-sectional schematic block diagram of Si chip integrating 3×3 waveguide coupler, 3 photodetectors and a light source on one substrate (similar to FIG. 9).
Figure 14C:
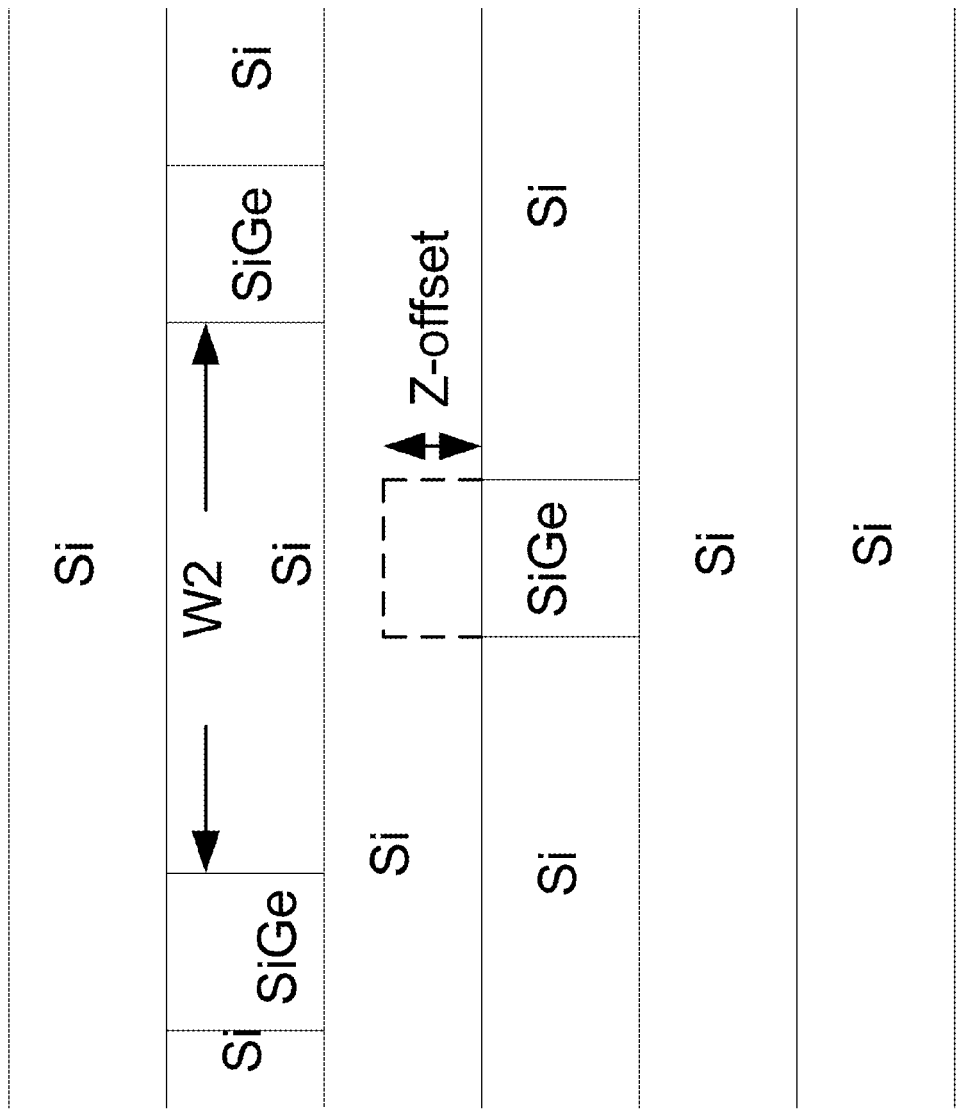
FIG. 14c shows a cross-sectional schematic block diagram of the Si chip integrating 3×3 waveguide coupler, 3 photodetectors and light source on one substrate of FIG. 14a at cross section 2-2.
Figure 14D:
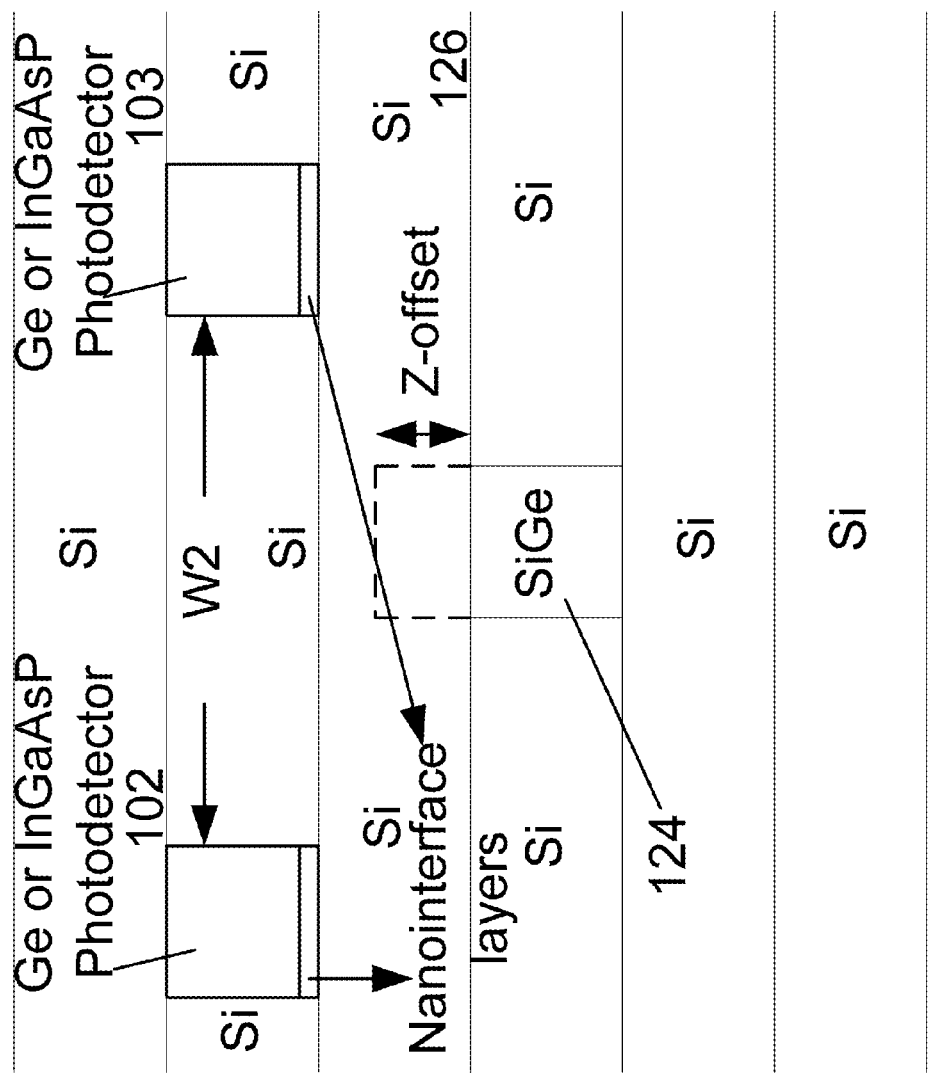
FIG. 14d shows a cross-sectional schematic block diagram of the Si chip integrating 3×3 waveguide coupler, 3 photodetectors and light source on one substrate of FIG. 14a at cross section 3-3.
Figure 14E:
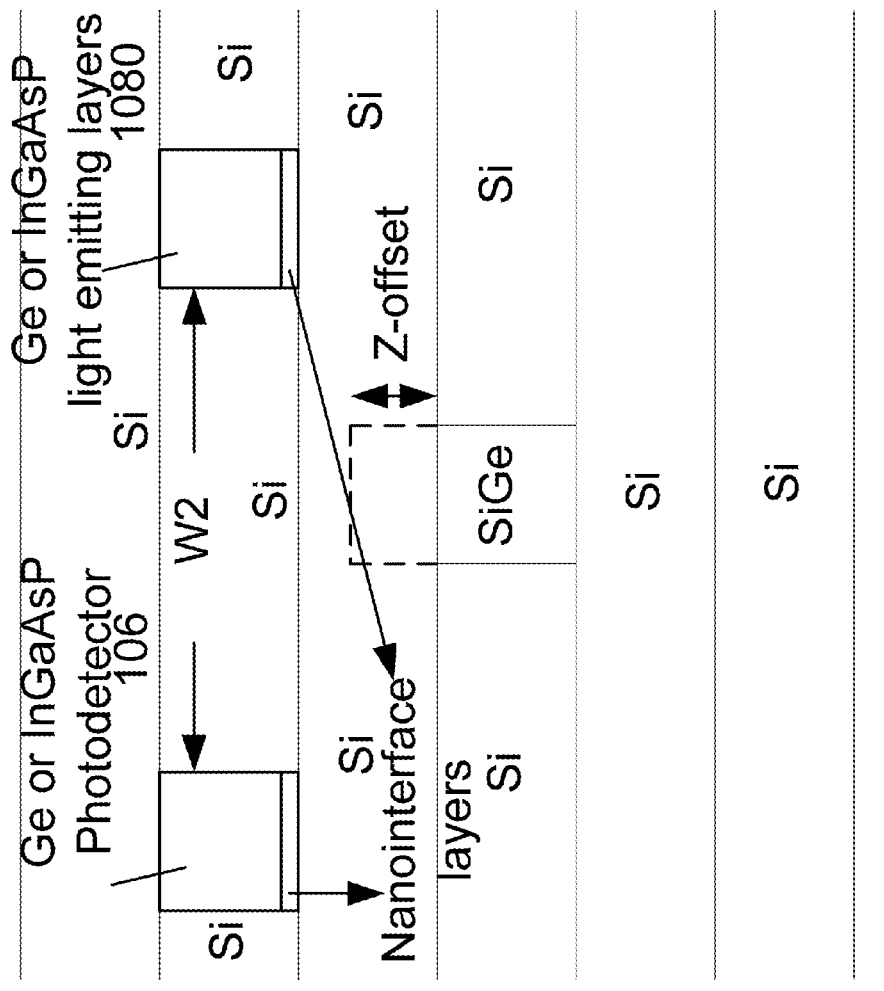
FIG. 14e shows a cross-sectional schematic block diagram of the Si chip integrating 3×3 waveguide coupler, 3 photodetectors and light source on one substrate of FIG. 14a at cross section 4-4.

FIG. 14a. Cross-sectional schematics of Si chip integrating 3×3 waveguide coupler, 3 photodetectors and a light source on one substrate (similar to FIG. 9). FIGS. 14b-to FIG. 14e show cross-sectional schematics at 1-1, 2-2, 3-3 and 4-4 locations. For example, reference is made to FIG. 4b to arrive at the 3×3 waveguide coupler using SiGe waveguides. An embodiment using SiGe MQW waveguide will make it different. FIG. 14c shows cross section at dashed line 2-2 for the 3×3 waveguide coupler also shown in FIG. 4b. The cross-section shown at dashed line 3-3 in FIG. 14d shows only the central waveguide of the 3×3 coupler and two photodetectors (102 and 103). This can be understood if we look only at the central waveguide of FIG. 4b. W2 is the separation between two outer arms of SiGe waveguides outside of the dashed coupler 101 where it is flared. FIG. 14e is similar to FIG. 14d except here we have one photodetector 106 and a SLD 1080 or equivalent.

Figure 15A:
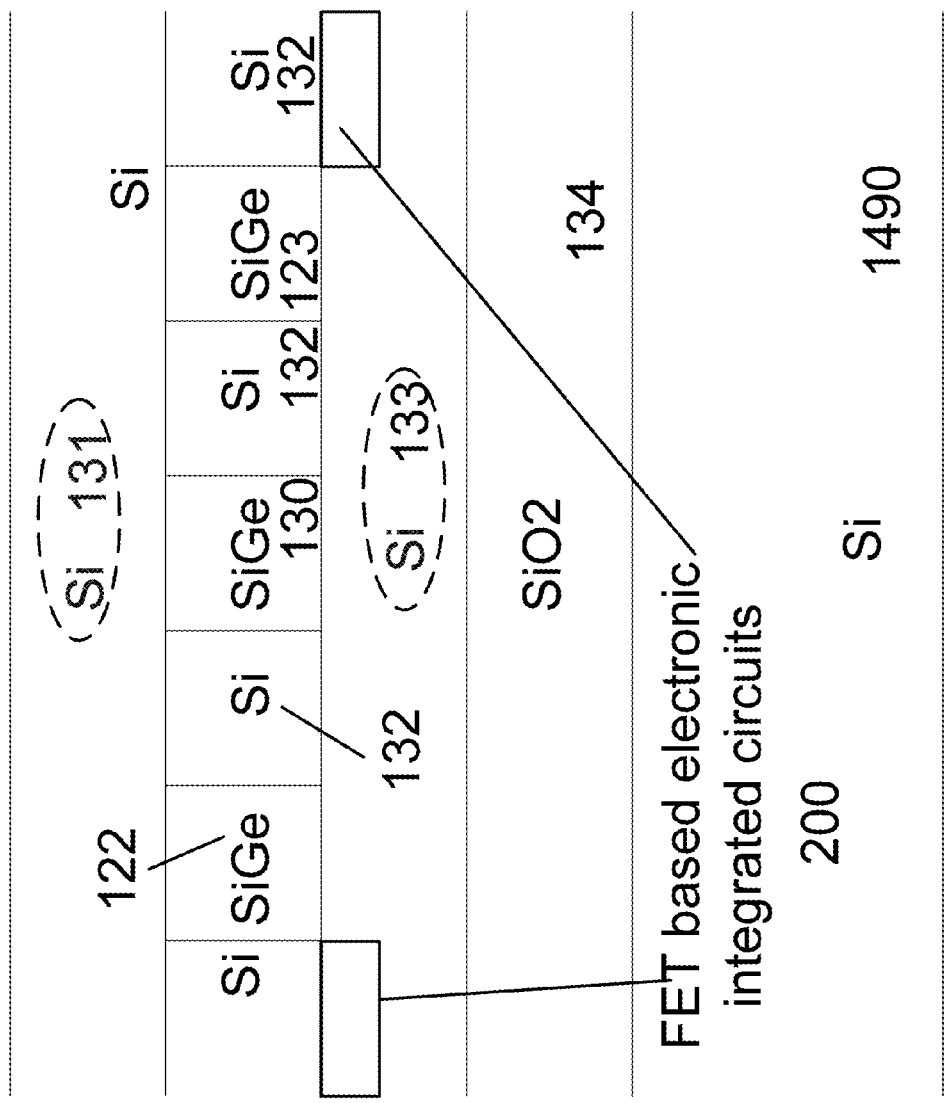
FIG. 15a shows the coplanar waveguides of FIG. 4d being used to schematically integrate Si electronics to process photodetector signals, driver for the light-emitting sources, as well as gating circuits, if needed, in the Si layer above the box SiO2.
Figure 15B:
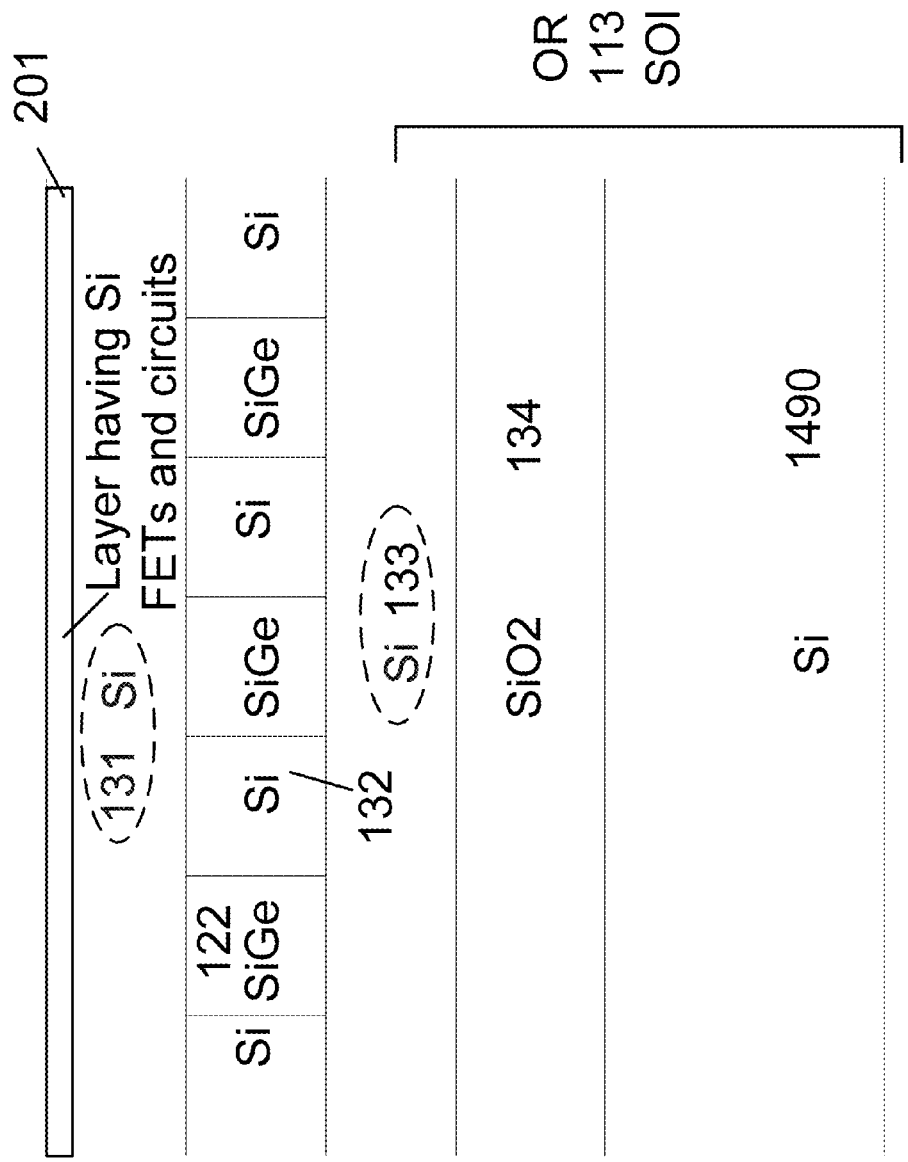
FIG. 15b shows the schematic integration of Si electronics to process photodetector signals, driver for the light-emitting sources, as well as gating circuits, if needed, in the Si layer above SiGe guides.

FIG. 15a. Using coplanar waveguides of FIG. 4d/4c, it shows schematically the integration of Si electronics 200 to process photodetector signals, driver for the light-emitting sources, as well as gating circuits, if needed, in the Si layer 133 above the box $SiO_2$ 134

Schematic integration of Si electronics to process photodetector signals, driver for the light-emitting sources, as well as gating circuits, if needed, in the Si layer above SiGe guides. In this schematic the electronics is realized on top of layer 131 and shown as 201.

Sensitivity: 3×3 couplers: The two photodetectors outputs are given by Equations 1 and 2 [6].

$$I_{PD1} = \frac{2}{9}\sigma P[1 + \cos(120° + 2\phi_s)] \quad (1)$$

$$I_{PD2} = \frac{2}{9}\sigma P[1 + \cos(120° - 2\phi_s)] \quad (2)$$

The differential output of photodetectors is given by Eq. 3 where σ is the detector responsivity, and P is power input, and $\phi_S$ is the Sagnac phase shift which depends on perpendicular component of angular velocity $\Omega_p$ ($\Omega_p = \Omega \cos \psi$) and other parameters.

$$I_{PD2} - I_{PD1} = \frac{2\sqrt{3}}{9}\sigma P \cdot \sin(2\phi_s) \quad (3)$$

With $\phi_s = \frac{8\pi A N \Omega_p}{\lambda c} \quad (4)$

Here, A is the area enclosed by each fiber loop, N is the number of loops, λ is the wavelength, and c the speed of light. It should be appreciated that the sensitivity depends on photodetector responsivity for a 3×3 waveguide coupler with a good degree of reciprocity. Ge photodetectors with nanowatt noise equivalent power (NEO) have been reported. FIGS. 2b-1 and 2b-2 show the differential output plots of Eq. 3 under various configurations.

Sensitivity: 2×2 couplers: The phase noise at quantum limit is expressed as noise equivalent rotation rate (in terms of phase modulation ($\Phi_m$) is expressed as [6])

$$NE\Omega = \frac{\lambda c}{8\pi\pi A}\sqrt{\frac{2hfB}{\eta P}}\frac{\sqrt{1+J_o(\Phi_m)}}{2J_1(\Phi_m)}. \quad (5)$$

For a typical fiber coil using P=100 μW and $\Phi_m$=1.8

$$NE\Omega/\sqrt{B} = 0.14^{(\mu r/s)}/\sqrt{Hz} = 0.03^{(°/h)}/\sqrt{Hz}. \quad (6)$$

Laboratory sensitivity of 0.1 to 1.0°/h can be improved if P is reduced to nanowatt range.

Three axes rate of rotation: Various configuration presented above describe schematics permitting the determination of the perpendicular component of angular velocity $\Omega_p$ ($\Omega_p = \Omega \cos \psi$) for a given plane. If we use three planes and find out the three orthogonal components, the actual orientation and its variation can be computed as a function of time. As a result to realize a practical gyroscope, the signal processing of three components need to be determined.

While the invention has been described with reference to exemplary embodiments, it will be understood by those skilled in the art that various changes may be made, and equivalents may be substituted for elements thereof without departing from the scope of the invention. In addition, many modifications may be made to adapt a particular on-chip structure using epitaxial layer growth methods to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. For example, in another embodiment the fiber coil may be replaced by a 3-dimensional coil like an integrated inductor coil on a Si substrate.

I claim:

1. A gyroscope which measures movement of a platform, comprising:
    a plurality of 3×3 and 2×2 waveguide couplers,
    a plurality of photodetectors,
    a light emitting source,
    a plurality of integrated circuits for generating control signals and processing signals from photodetectors,
    wherein the waveguides are disposed on a substrate selected from Si, Si-on-insulator (SOI), GaAs, InP, GaN, Ge, SiC, Si-on- Sapphire (SOS),
    wherein plurality of waveguides are constructed from SiGe, Si—SiGe multiple quantum wells, doped SiO2, SiOx-cladded —Si quantum dots, GeOx-cladded-Ge quantum dots, and
    wherein configuration of said waveguides is selected from buried, ridge, rib, and two-dimensional photonic band gap (PBG),
    wherein said 3×3 waveguide coupler has three waveguides, two outer and a central waveguide, and wherein the three waveguides are in proximity over a certain length to produce light coupling between them,
    wherein the two outer and central waveguides are disposed in a configuration selected from coplanar and non-coplanar,
    wherein two outer waveguide ends of said 3×3 waveguide coupler are interfaced with a fiber coil, and wherein the central waveguide is terminated before the fiber coil interface with a first absorber device which absorb any optical energy not coupled to the outer waveguide in the region where the all three are in proximity,
    wherein the input ends of the outer waveguides of said 3×3 waveguide coupler are interfaced with first and second photodetectors, and
    wherein the input end of the central waveguide is interfaced with said light emitting source, and wherein a section of central waveguide between the first absorber device and light emitting source is interfaced with a 2×2 waveguide coupler, and wherein the second waveguide forming the 2×2 coupler along with the central waveguide is interfaced with a third photodetector, and wherein the other end of the second waveguide is interfaced with a second absorber device, and wherein said light emitting source emit optical energy that is compatible with said waveguide couplers and fiber coil, and wherein light emitting source is selected from an on-chip and off-chip structural configurations, and wherein said light-emitting source is ON continuously for a duration that avoids interference from returned optical energy after traversing the fiber coil to enable determination of change in the signal due to light traveling in clockwise and counter clockwise directions, wherein said first, second, and third photodetectors are interfaced with plurality of integrated circuits, and wherein electronic circuits generate control signals and process outputs of said first, second and third photodetectors, and wherein the processed signal information provides data relating to one of the three angular velocity components of the platform plane on which the gyroscope unit is located.

2. The gyroscope of claim 1, wherein the gyroscope includes three gyroscope devices configured to integrate three sets of angular velocity in three orthogonal planes to compute velocity of the platform.

3. The gyroscope of claim 1, further comprising photonic band gap based waveguides and claddings layers, wherein the photonic band gap based waveguides are constructed from materials selected from one of Si, SiGe, Si—SiGe multiple quantum wells, SiOx-cladded Si quantum dots, cladded SiGe quantum dots, and wherein the photonic band gap based waveguides include photonic band gap lattice low index of refraction regions, wherein the photonic band gap lattice low index of refraction regions are filled with material selected from one of cladded quantum dots, $SiO_2$, SiON, and $Si_3N_4$, and wherein the photonic band gap based waveguides are configured such that when an external voltage is applied to sections of the photonic band gap based waveguides the phase of optical energy traveling in one or more of said 3×3 and 2×2 waveguide couplers is changed.

4. The gyroscope of claim 1, further including one fiber coil, waveguide coupler using one 3×3 and one 2×2, an integrated light-emitting source, and three integrated photodetectors, at least one phase modulator, integrated circuits for signal processing, implemented on a substrate selected from Si, Si-on-Insulator (SOI), SiGe-on-Si, InGaAs-on-Si, and doped oxides on Si, wherein one or more of the waveguides, photodetectors, and phase modulators can be realized in multiple quantum well configurations.

* * * * *